(12) United States Patent
Thompson

(10) Patent No.: US 12,460,162 B2
(45) Date of Patent: Nov. 4, 2025

(54) SYSTEM AND METHOD FOR CLOSED PROCESSING OF RAPIDLY AGING ALCOHOLIC BEVERAGES

(71) Applicant: Robert Thompson, Monroe, WA (US)

(72) Inventor: Robert Thompson, Monroe, WA (US)

( * ) Notice: Subject to any disclaimer, the term of this patent is extended or adjusted under 35 U.S.C. 154(b) by 705 days.

(21) Appl. No.: 17/893,652

(22) Filed: Aug. 23, 2022

(65) Prior Publication Data

US 2023/0287315 A1    Sep. 14, 2023

Related U.S. Application Data

(63) Continuation-in-part of application No. 17/588,549, filed on Jan. 31, 2022, now Pat. No. 11,434,455.

(51) Int. Cl.
| | |
|---|---|
| *C12G 3/07* | (2006.01) |
| *C12H 1/22* | (2006.01) |
| *C12H 6/02* | (2019.01) |
| *C12G 3/06* | (2006.01) |

(52) U.S. Cl.
CPC ............... *C12G 3/07* (2019.02); *C12H 1/22* (2013.01); *C12H 6/02* (2019.02); *C12G 3/06* (2013.01)

(58) Field of Classification Search
CPC ... C12G 3/07; C12G 3/06; C12H 1/22; C12H 6/02
USPC ...... 99/277.1, 277.2; 426/11, 422, 433, 442, 426/592
See application file for complete search history.

(56) References Cited

U.S. PATENT DOCUMENTS

| | | | |
|---|---|---|---|
| 2,586,133 A | 2/1952 | Wilken | |
| 5,778,763 A | 7/1998 | Ford, Sr. | |
| 10,196,595 B2* | 2/2019 | Butte | C12H 1/22 |
| 10,633,620 B2 | 4/2020 | DeCaro et al. | |
| 2010/0092636 A1 | 4/2010 | Watson et al. | |
| 2020/0255777 A1* | 8/2020 | Fearnside | C12G 3/08 |
| 2020/0392436 A1 | 12/2020 | FitzPatrick et al. | |
| 2024/0026256 A1* | 1/2024 | Bolton | C12G 3/07 |
| 2024/0425782 A1* | 12/2024 | Aldenderfer | C12G 3/07 |

\* cited by examiner

*Primary Examiner* — Reginald Alexander
(74) *Attorney, Agent, or Firm* — Bold IP, PLLC; Houda El-Jarrah

(57) ABSTRACT

A system and method for rapidly aging using a closed system to process an unaged distilled spirit to produce rapidly aged spirits over a very fast period of time. A processing vessel dedicated to holding the unaged spirit and mixing the unaged spirit with charred wood staves is provided. A computer application is used to schedule the sequence of steps for a recurring period of time to age the unaged spirit. The closed system uses a first production tank and a second production tank that are partially filled with liquid and are connected to the processing vessel. Compressed pressurized air is added and released over a period of time to add and release pressure to the second production tank, and to influence the flow of oxygen between the second production tank and the processing vessel in order to age the contents of the processing vessel with minimal vapor loss from the aging spirit.

20 Claims, 14 Drawing Sheets

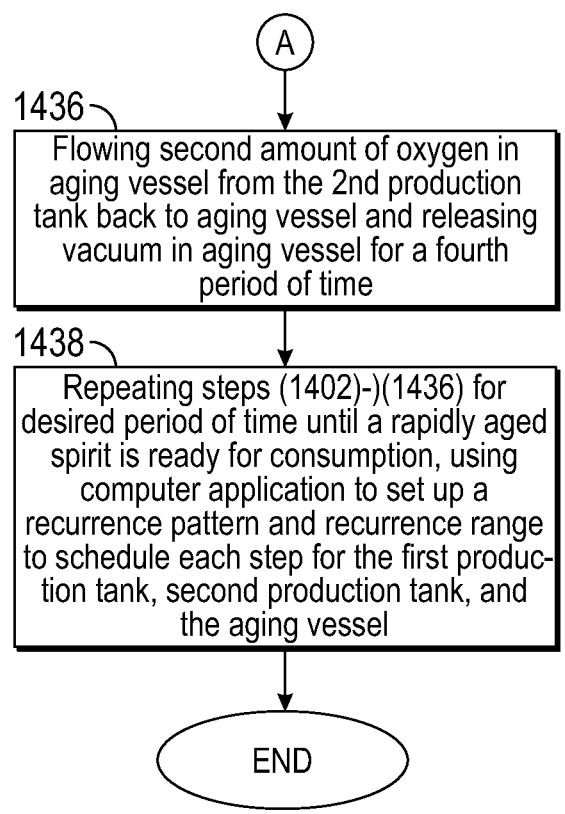
FIG. 14 (Continued...)

SYSTEM AND METHOD FOR CLOSED PROCESSING OF RAPIDLY AGING ALCOHOLIC BEVERAGES

CROSS-REFERENCE TO RELATED APPLICATIONS

This application is a continuation in part application that claims priority to a non-provisional application Ser. No. 17/588,549 filed on Jan. 31, 2022, which is incorporated by reference in its entirety.

FIELD OF THE DISCLOSURE

The present invention relates to a system and method for closed processing rapidly aging and maturing unaged distilled spirits (such as moonshine) and infusing the unaged distilled spirits or moonshine with charred wood staves in a pressurized vessel in order to produce alcoholic beverages with a great deal of flavor and a distinctive taste for each type of rapidly aged alcoholic beverage that, in some cases, simulates traditional alcoholic drinks, such as brandy, bourbon, and scotch that traditionally require many years to produce if aged in the traditional manner. The closed rapid aging and maturation process is useful for preventing vapor loss in the produced rapidly aged system.

BACKGROUND

Alcoholic beverages and specialty spirits, such as rum, brandy, scotch, and whiskey, are types of distilled spirits that traditionally are aged over a long period of time in various types of wood barrels to produce a distilled liquor having a unique flavor. The normal aging process can take one or more years, usually taking multiple years. Each type of alcoholic beverage has unique flavor profiles and tastes based on the period of time that the alcoholic beverage was aged and the types of wood barrels used. The traditional approach and process to create alcoholic beverages that are traditionally aged is very time consuming in that many years are required to pass before the aging spirit achieves the smoothness and taste profile desired of each type of alcoholic beverage.

Accordingly, there is a need for an improved, faster system that can age an unaged distilled spirit but without sacrificing the taste, smoothness, and quality of the rapidly aged spirit.

SUMMARY

A computer implemented method for rapidly aging spirits using a closed rapid aging system using a computing application. In a non-limiting embodiment, the method may include opening a first solenoid valve coupled to a first production tank, wherein the first production tank is partially filled with a first volume of liquid. The method includes providing adding pressurized air to the first production tank for a first period of time. Upon adding pressurized air to the first production tank, the method includes causing the first volume of liquid to flow from the first production tank to a second production tank, wherein the second production tank is initially partially filled with a second volume of liquid, and wherein the second production tank is further filled with a first volume of oxygen in addition to the second volume of liquid.

Upon causing the first volume of liquid to flow from the first production tank to the second production tank, the method includes opening a first solenoid valve coupled to an aging vessel, whereby the aging vessel comprises a mixture of unaged distilled spirit and wood staves, and further wherein the aging vessel further comprises a second volume of oxygen, wherein at least one oxygen conduit is coupled from the second production tank to the aging vessel in order for the first volume of oxygen in the second production tank and the second volume of oxygen in the aging vessel to be able to flow back and forth from the second production tank to the aging vessel over a period of time.

Upon opening the first solenoid valve coupled to the aging vessel, flowing the first volume of oxygen to the aging vessel through the at least one oxygen conduit for a duration of the first period of time, wherein the mixture of unaged distilled spirit and wood staves is pressurized. After the first period of time is complete, the method includes opening a second solenoid valve coupled to the first production tank and releasing the pressurized air in the first production tank for a second period of time. Upon releasing the pressurized air in the first production tank for the second period of time, the method may include flowing the first volume of liquid that transferred to the second production tank back to the first production tank, causing the pressure in the second production tank to be reduced, wherein the second volume of liquid in the second production tank becomes generally equalized with the first volume of liquid in the first production tank. Upon the releasing of the pressurized air in the first production tank, the method may include opening a second solenoid valve coupled to the aging vessel and flowing the second volume of oxygen in the aging vessel back into the second production tank for the second period of time thereby relieving the pressurized air in the aging vessel. The method may further include opening a third solenoid valve coupled to the first production tank and creating a vacuum in the first production tank for a third period of time, which causes a vacuum to occur in the second production tank such that the second volume of liquid is pulled into the first production tank from the second production tank.

Upon creating a vacuum in the first production tank for the third period of time, the method may include opening a third solenoid valve coupled to the aging vessel. Upon opening the third solenoid valve coupled to the aging vessel and creating the vacuum in the first production tank for the third period of time, the method may include flowing the second volume of oxygen in the aging vessel into the second production tank to create a vacuum in the aging vessel for a duration of the third period of time. The method further includes opening a fourth solenoid valve after the third period of time has ended, wherein the fourth solenoid valve is coupled to the first production tank. Upon opening the fourth solenoid valve, the method may include releasing the vacuum for a fourth period of time, wherein the second volume of liquid is pushed back into the second production tank. The method may further include opening a fourth solenoid valve coupled to the aging vessel, wherein upon opening the fourth solenoid valve coupled to the aging vessel, the second volume of oxygen is returned through the at least one oxygen conduit to the aging vessel and the vacuum is released. The steps of the method recited above are repeated for a desired period of time until a rapidly aged spirit is ready for consumption wherein the computing application comprises one or more interfaces for setting a recurrence pattern and recurrence range to schedule for rapidly aging the spirits in the closed rapid aging system comprising the first production tank, the second production tank, and the aging vessel.

The method may further include releasing the vacuum to create a disturbance of and rapid agitation of the unaged distilled spirit with air bubbles in the aging vessel. The first volume of liquid in the first production tank and the second volume of liquid in the second production tank are not allowed to transfer into the aging vessel. But the first volume of oxygen in the second production tank and the second volume of oxygen in the aging vessel are allowed to travel back and forth through one or more oxygen conduits between the aging vessel and the second production tank.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description is drawn to an innovative computer implemented system for producing alcoholic beverages that are rapidly aged using a repeatable sequence that is controlled by a computer application, a set of relays on a relay controller board, a set of solenoid valves, an air compressor connected to an air filtration system, and a vacuum pump, in which aging spirit is mixed with charred wood staves in one or more vessels. Further details are provided below with respect to the Figures.

Figure 1:
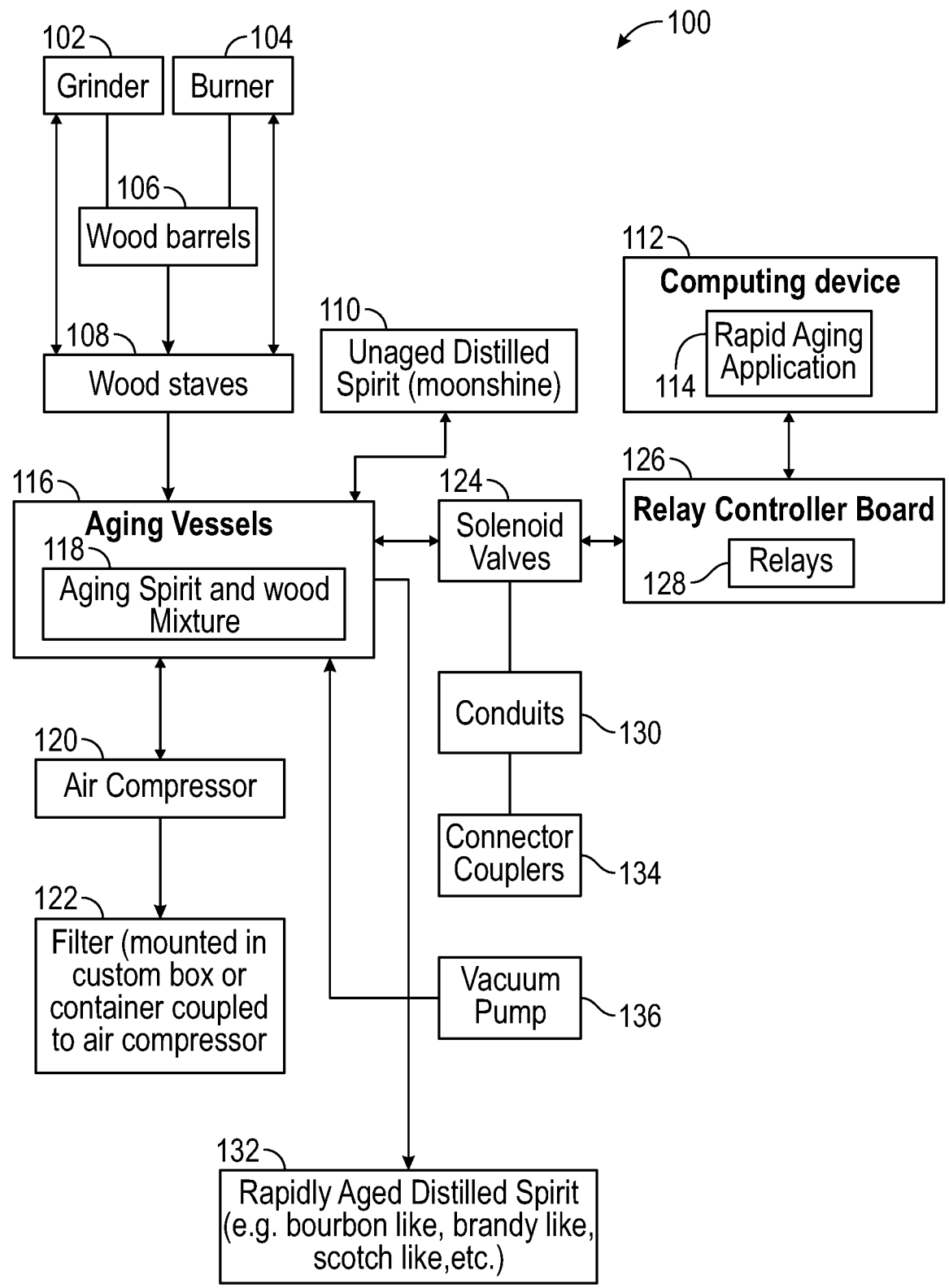
FIG. 1 depicts a block diagram of a system for rapidly aging ethanol spirits or an unaged distilled spirit using the system described herein.

FIG. 1 provides a block diagram of a system 100 for creating a rapidly aged distilled spirit 132. A unique advantage of the system 100 as described herein is that the rapid aging process described herein, according to one or more non-limiting embodiments, may take between 90 to 120 days as a non-limiting average to produce a rapidly aged distilled spirit 132 having the same distinctive taste and flavor as a traditionally aged alcoholic beverage. As noted above, the traditionally aged alcoholic beverages may take a minimum of one to two years to age in order to achieve a same flavor profile, or a considerably longer period of time to achieve the desired taste. Further, disadvantages of the traditional methods of producing alcoholic beverages are very costly and time consuming, with a great deal of uncertainty about whether the expense and investment in the aging of the spirits is going to produce enough yield to cover the expense and investment over a long period of time. The system 100 as described herein provides an improved alcoholic beverage that is rapidly aged that can be reliably created in a small space, reproduced as needed, consumed, bottled, and sold in a much quicker, shorter period of time.

FIG. 1 shows a number of components that make up the system 100 to convert an unaged distilled spirit (moonshine or raw product) 110 and produce a matured, drinkable, rapidly aged distilled spirit 132. The unaged distilled spirit 110 may interchangeably be referred to herein as moonshine and/or ethanol. Moonshine is known to be a high proof liquor with a very strong taste. In order for a liquor to be produced that has the same appealing taste as a whiskey, rum, brandy, or other alcoholic beverage, the moonshine may have to be further distilled and also need to be aged while interacting and infusing into pieces of charred wood, such as wood staves 108 in the system 100.

Ethanol is a chief component of moonshine 110 and is rapidly aged according to the system 100 shown in FIG. 1 to produce the rapidly aged distilled spirit 132 having either a flavor taste and smoothness that replicates and resembles a bourbon, brandy, scotch, whiskey, rum, or any similar alcoholic beverages that are usually aged for a period of time in a wooden barrel to achieve a desired taste profile and proof. Each rapidly aged distilled spirit 132 has to be rapidly aged and, depending on which type of label that it is given and which alcoholic beverage the distilled spirit 132 is made to resemble (e.g., bourbon, whiskey, rum, scotch, etc.), some rapidly aged distilled spirits 132 may be ready after a minimum rapid aging process while others may take a little longer. This is why the range of time to achieve a rapidly aged distilled spirit 132 may take between 90-120 days to bottle and consume to replicate a desired taste and follow a specific developed recipe.

Accordingly, the unaged distilled spirit 110 may be provided from various types of grains or materials depending on the final taste of the rapidly aged distilled spirit 132 that the user/distiller is trying to achieve. The raw materials are converted into a mash according to one or more known processes for creating mash, which serves as a fermented base. The fermented base is then distilled for a minimum period of time. Distillation is the process of separating alcohol from water via evaporation and condensation. The distillation process purifies and concentrates the remaining alcohol, which will ultimately be the final produced spirit. Numerous distillations can be done prior to the next step of the process (the rapid aging of system 100) and depending on the style of the final distilled spirit 132 that is desired to be made by the user/distiller, multiple distillations as well as distillation to a minimum proof of alcohol are often required. It is noted that alcoholic beverages are measured or described in terms of the percentage of alcohol by volume (ABV) which is a standard used in most countries around the world. Additionally, the "proof" of the alcohol may be used as a measurement or indicator to indicate the amount of alcohol in a beverage, but the proof scale can vary depending on the country. In the United States, the proof of an alcoholic beverage is straight up two times alcohol by volume. So, for example, vodka that is 40 ABV can also be referred to as 80 proof (i.e., twice the ABV) in the United States.

In a non-limiting embodiment, the system 100 shown in FIG. 1 employs the use of wooden barrels 106 that are purchased and torn/broken down into smaller pieces which may be referred to as "wood staves." In a non-limiting embodiment, a grinder 102 may be used to grind any wood staves and/or lids obtained from the larger wooden barrels for the purpose of removing old wine or any other spirits that have been absorbed or penetrated into the wooden barrels 106. This step may be particularly useful when the wooden barrels 106 are used wooden barrels as opposed to new wooden barrels.

Next, the wood staves 108 are burned using any type of burner device 104 in order to char or partially burn the grounded wood staves 108 so as to blacken their surfaces. Charring the wood staves 108 helps to further ensure a particularly appealing taste profile may be achieved for the rapidly aged distilled spirit 132. The wood barrels 106 may be obtained from various types of wooden barrels. In a non-limiting embodiment, the wood barrels 106 may be used wooden barrels, although new wooden barrels may also be utilized if needed in other cases. In some non-limiting embodiments, the wood barrels 106 may be new or used American oak. In other cases, the wood barrels 106 may be new or used French oak. It is further described below how certain recipes of rapidly aged distilled spirit 132 that are created to replicate a unique flavor, smoothness, or taste of a particular type of alcohol, such as either brandy, scotch, whiskey, or rum, may preferably use either used or new wood barrels 106 of either American or French oak. Further, some recipes as further described below, may reuse wood staves 108 that were previously used to produce a first rapidly aged spirit 132. It is noted that the wooden barrels 106 may be made from other types of wood other than American oak or French oak as part of the rapidly aged process and system 100 shown in FIG. 1 and described herein.

Figure 3:
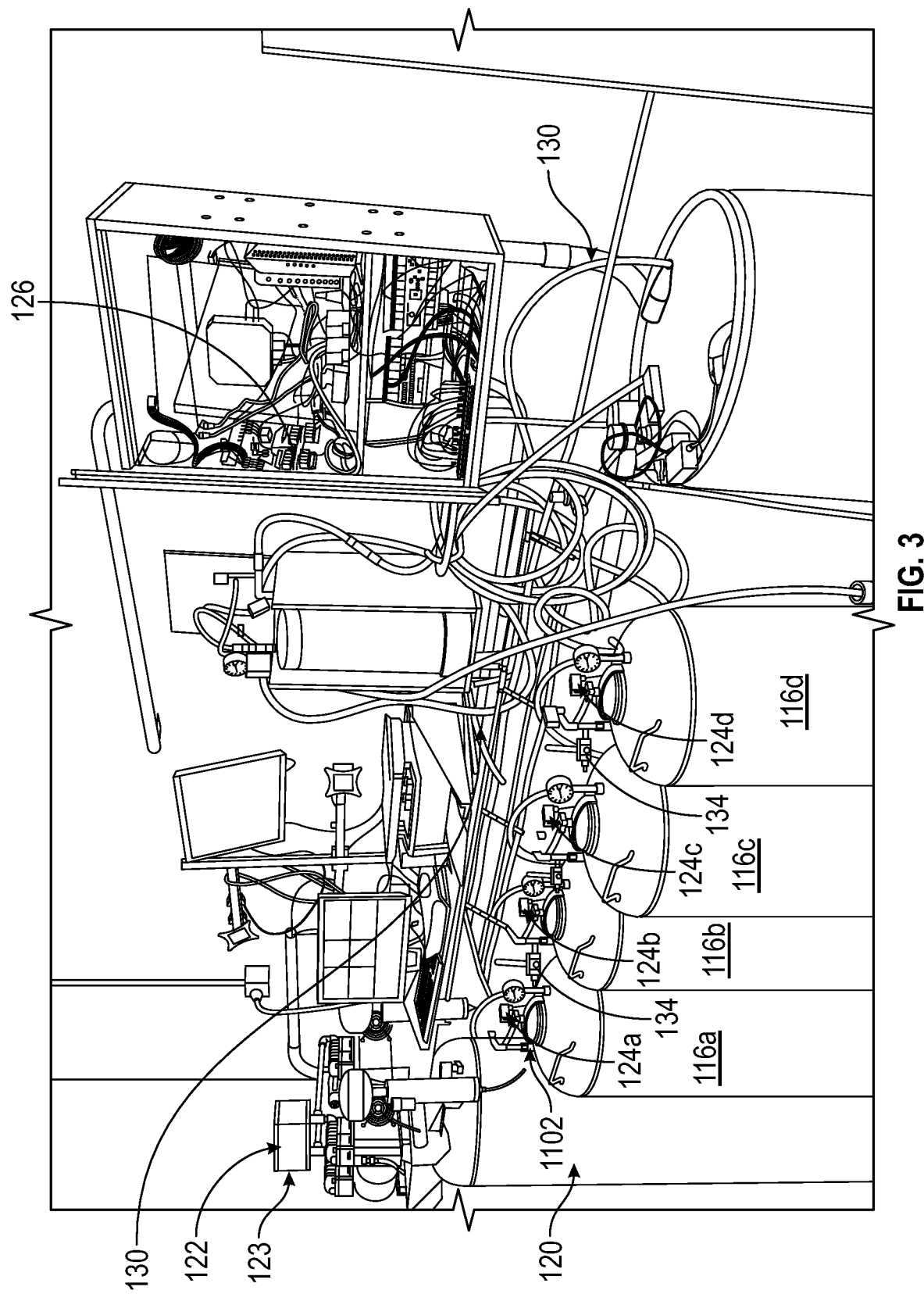
FIG. 3 depicts a pictorial illustration of processing vessels with unaged distilled spirits and wood staves in a rapid aging process in a production facility.

Once the wood staves 108 are produced by being grinded and burned/charred, the wood staves 108 may be added in a desired amount to an interior cavity of an aging vessel 116 and combined with a particular proof/ABV of moonshine 110. Accordingly, a desired amount of unaged distilled spirit or moonshine 110 is also piped into or otherwise added to the interior of the aging vessel 116. The combination of the first amount of unaged distilled spirit or moonshine 110 and wood staves 108 combines within the aging vessel 116 to produce the aging spirit and wood mixture 118 shown in FIG. 1. It is noted that the term "aging vessel" may be interchangeably referred to herein as "processing vessel" or simply "vessel." FIG. 3 shows a pictorial example of a non-limiting embodiment of an aging vessel 116, as does FIG. 4.

In a non-limiting embodiment, an air compressor 120 is a component of the system 100 of FIG. 1. The air compressor 120 may function to deliver pressurized air to aging vessel 116. The pressurized air delivered from the air compressor 120 may further be filtered in order to prevent impurities in the air used by the air compressor 120 from affecting a quality of the aging spirit and wood mixture 118 and to improve the quality of the rapidly aged distilled spirit 132. Accordingly, in a non-limiting embodiment, a filter 122 is coupled to a top part or another area of the air compressor 120 to filter the outside air taken in by the air compressor 120 so that the pressured air outputted from the air compressor 120 has been filtered. In a non-limiting embodiment, the filter 122 is mounted in a custom box or other type of container and attached to or otherwise coupled to the air compressor 120.

Figure 4:
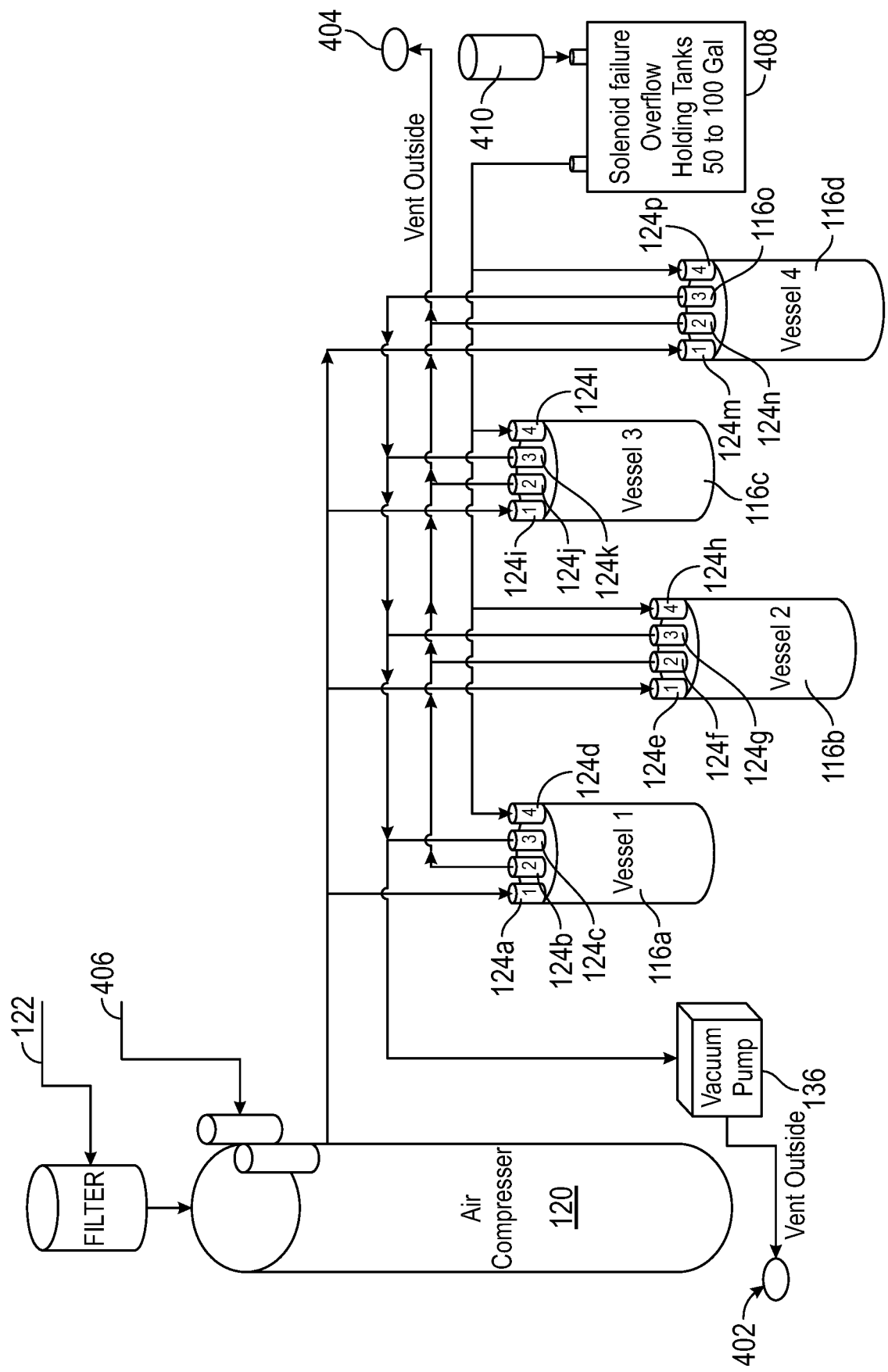
FIG. 4 depicts a pictorial illustration of the system shown in FIG. 3 for rapidly aging spirits.

In a non-limiting embodiment, an exemplary type of air compressor 120 may be the CALIFORNIA AIR TOOLS 60040DCAD which includes an air drying system and built in air dryer cartridge system to eliminate a majority of the water vapor in the air in order to protect sensitive machinery. FIG. 4 shows a schematic of an air compressor 120 having attached air drying cartridges 406 that function to minimize water vapor in the air to protect the aging vessels 116 and other electronic equipment located in the vicinity of the aging vessels 116. Further, in a non-limiting embodiment, the filter 122 may be a HEPA (high efficiency particular air) filter and air purifier that measures 15 inches in length by 4½ inches wide in a non-limiting embodiment. As known by one of ordinary skill in the art, HEPA filters must achieve a standard of efficiency in removing particles of the air that passes through the HEPA air filter. FIG. 3 shows a non-limiting example of a HEPA filter 122 mounted or otherwise contained in a filter box 123, as shown in FIG. 3, and coupled to air compressor 120 in a facility for producing rapidly aged distilled spirits 132 according to a non-limiting embodiment.

The system 100 shown in FIG. 1 may further utilize a vacuum pump 136. In a non-limiting embodiment, the vacuum pump 136 functions to draw gas molecules (air) from a sealed volume in the aging vessel 116 in order to leave behind a vacuum. It is known that a purpose of a vacuum pump 136 is to generate a relative vacuum within a capacity. In a non-limiting embodiment, the vacuum pump 136 may function to create a medium vacuum within a range of −15 to −30 psi. Each vessel 116 may include an all in one pressure/vacuum gauge (e.g., 30 HG/150 psi). The gauge will indicate all corrections required to the timing of the processing software 114 in a non-limiting embodiment.

Figure 9:
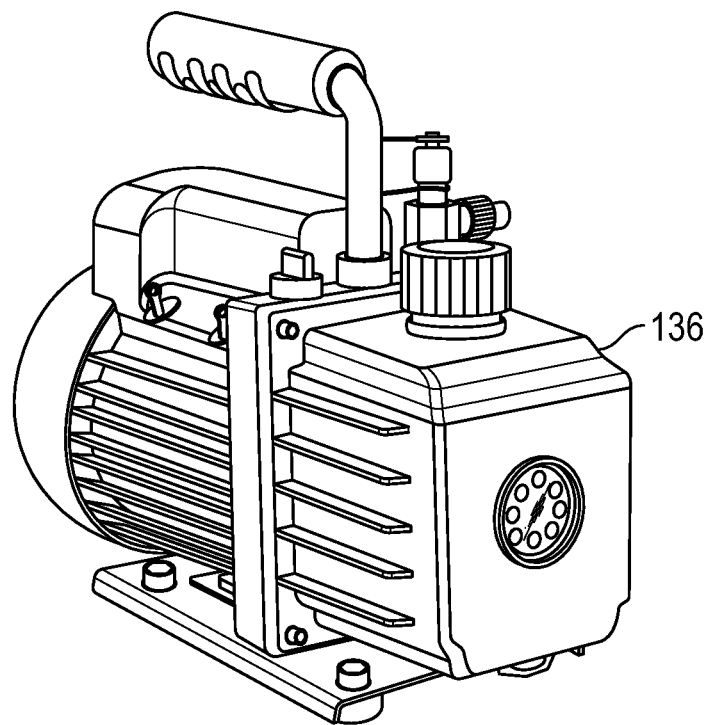
FIG. 9 depicts an exemplary vacuum pump.

In a non-limiting embodiment, it may be preferable for the vacuum pump 136 to be a rotary vane pump. FIG. 9 shows a non-limiting example of a 3.6 CFM single stage rotary vane pump that may be used as vacuum pump 136, whereby the voltage and frequency are rated at 110V/60 Hz and the flow rate is 3.6 CFM, while the vacuum is 75 mircon and power is ¼ horsepower (HP). Other types and models of vacuum pumps 136 may be used and selected in other non-limiting embodiments.

One or more conduits 130 may be utilized by the system 100 to couple the air compressor 120 and the vacuum pump 136 to ports (e.g., ports 1108, 1110, 1112, and 1114) of the aging vessel 116 as further explained below. The one or more conduits 130 may include hoses, pipes, tubes, or other forms of conduits used to pass fluids, such as air and/or liquid if needed. Further, the one or more conduits 130 may connect to the solenoid valves 124 on each end of the solenoid valves 124 along with the connector couplers 134, as shown in FIG. 1 and FIG. 3. In a non-limiting embodiment, all solenoid valves 124 have a high-pressure air hose (e.g., conduit 130) with quick release coupler connectors 134. Each connector coupler 134 may be brass industrial quick release coupler connectors 134. Further, each connector coupler 134 may have two parts, one male and female. One part of the coupler connector 134 may be connected to the air hose (i.e., conduit 130) that is connected to the solenoid valve 124. The other end of the coupler connector 134 may be connected to an extremely durable, high-pressure PEX cross-linked polyethylene tubing (e.g., conduit 130) and then connect to an air compressor 120 or the vacuum pump 136 in one or more non-limiting embodiments.

Notably, an important part of the method and system 100 for rapidly aging unaged distilled spirit 110 to produce a rapidly aged distilled spirit 132 is to run the aging spirit and wood mixture 118 through a series of timed sequences of steps (referred to as a "recurrence pattern") for enough days/months (referred to as a "recurrence range") to achieve the desired flavor and taste. A first sequence may include pressurizing the aging spirit and wood mixture 118 for a period of time by activating the air compressor 120 coupled to the filter 122. A second sequence in the method may include releasing that pressurized air and venting the released air outside 404 as shown in an example in FIG. 4. Subsequently, the method includes a third sequence of vacuuming any remaining air out of the vessel 116 for a period of time by activating the vacuum pump to create a partial vacuum and then venting the remaining air outside at 402 as shown in FIG. 4 in a non-limiting example. The fourth sequence may include releasing the partial vacuum created in the aging vessel 116 which creates a disturbance and further causes the mixture 118 of unaged spirit and wood to further mix and settle at a bottom of the aging vessel 116. These four sequences or steps are repeated for any number of days/months and as set using the rapidly aging computer application 114 as needed to produce the rapidly aged distilled spirit 132 that is either bourbon-like, brandy-like, scotch like, or has some other taste or flavor.

It is noted that pressurizing the contents of the aging vessel 116, which includes the mixture of unaged spirit and charred wood staves 108 by adding compressed, filtered air via the air compressor 120 and then vacuuming the mixture 118, forces the unaged spirit to be pushed into the individual pieces of charred wood staves 108 during the pressurization step (first sequence) and then pulled back out again of the charred wood staves 108 during the vacuuming process (third sequence). This infusion process causes the unaged distilled spirit or moonshine 110 to simulate the aging process of traditionally aged alcoholic beverages, such as whiskey, rum, or bourbon (without limitation) whereby an unaged spirit sits for many years in a particular type of wooden barrel and naturally seeps into and out of the wooden barrel with time until a finished aged alcoholic product is produced. As noted above, the traditional methods of allowing the unaged, fermented spirit to stay within the wooden barrels to age takes years in comparison to the rapid aging system and method 100 as shown in FIG. 1 and described herein.

The fourth step/sequence described above in which the vacuum is released creating a disturbance and violent agitation within the aging spirit and wood mixture 118 within the aging vessel 116 is additionally preferable because the aging spirit and charred wood staves 108 are further forced to mix within the aging vessel 116 and the flavor of the rapidly aged distilled spirit 132 is improved.

In order to activate the air compressor 120 to provide pressurized, compressed air to each aging vessel 116 that is processing unaged distilled spirit or moonshine (110) and then release the pressurized air after a scheduled period of time and then activating the vacuum pump 136 to vacuum any remaining air and then releasing the vacuum, one or more solenoid valves 124 may be utilized in the method and system 100 as shown in FIG. 1. A solenoid valve, such as solenoid valve 124 is an electromechanically operated valve that uses electric current from a relay to be energized (turned on) and de-energized (turned off). Solenoid valves 124 are beneficial for regulating fluid flow, including the flow of gas, such as any air provided by the air compressor 120 and then vacuumed by the vacuum pump 136. Accordingly, the solenoid valves 124 function to control the flow of liquid or gas fluids in the system 100. The solenoid valves 124 normally include a plunger to open or close the solenoid valves 124, thereby allowing the fluid to flow through or sealing the opening off without any leaks. The solenoid valves 124 serve an important function in the automation of fluid and gas control.

In a non-limiting embodiment, there may be at least four solenoid valves coupled to each processing vessel 116, as shown in FIG. 4, in which each processing vessel 116a, 116b, 116c, and 116d includes its own particular combination of aging spirit and wood mixture 118. In one or more non-limiting embodiments, coupled to each processing vessel 116 are four specific solenoid valves that each are assigned a specific function. For example, a first processing vessel 116a includes connected solenoid valves 124a, 124b, 124c, and 124d. A second processing vessel 116b includes connected solenoid valves 124e, 124f, 124g, and 124h. A third processing vessel 116c includes connected solenoid valves 124i, 124j, 124k, and 124l. A fourth processing vessel 116d includes connected solenoid valves 124m, 124n, 124o, and 124p as shown in FIG. 4. It is noted that all the solenoid valves 124 are connected to designated ports 1108, 1110, 1112, 1114 as shown in FIG. 11B on each vessel 116a, 116b, 116c, and 116d using one or more conduits 130 and connector couplers 134 as described above and as shown in FIG. 1 and FIG. 3. Each solenoid valve 124 is designated to perform particular functions in accordance with the four steps/sequences mentioned above. For example, the first solenoid valves 124a, 124e, 124i, and 124m on each vessel 116a, 116b, 116c, and 116d, respectively, may function to allow pressurized, filtered air to flow into each respective vessel 116a, 116b, 116c, and 116d for a first period of time using the rapid aging application 114 to schedule this time period.

The second solenoid valve 124b, 124f, 124j, 124n on each vessel 116a, 116b, 116c, and 116d, respectively, may function to release the pressurized, filtered air to flow out of each respective vessel 116a, 116b, 116c, and 116d at a scheduled point in time using the rapid aging scheduling program 114.

The third solenoid valve 124c, 124g, 124k, 124o on each vessel 116a, 116b, 116c, and 116d, respectively, may function to vacuum any remaining air out of each respective vessel 116a, 116b, 116c, and 116d at a scheduled point in time using the rapid aging scheduling program 114.

The fourth solenoid valve 124d, 124h, 124l, 124p on each vessel 116a, 116b, 116c, and 116d, respectively, may function to quickly release a vacuum out of each respective vessel 116a, 116b, 116c, and 116d at a scheduled point in time using the rapid aging scheduling program 114. Using these four key steps for each vessel 116a, 116b, 116c, 116d, the rapidly aged distilled spirit 132 may be produced having a great deal of flavor and taste and maturation that compares to a traditionally aged spirit (e.g. whisky, rum, scotch, etc.).

Figure 11A:
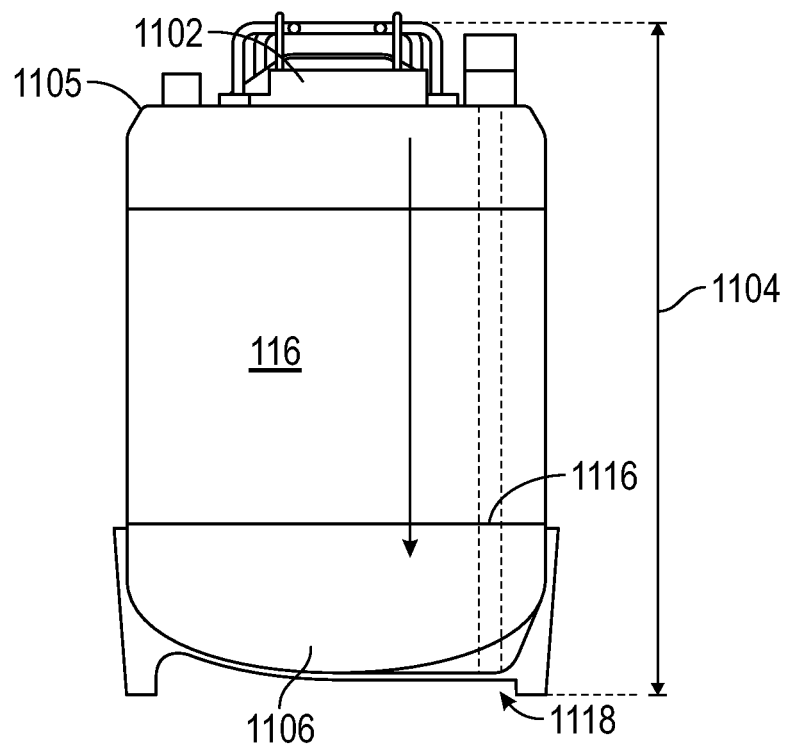
FIG. 11A depicts a a front side and interior view of an exemplary vessel.
Figure 11B:
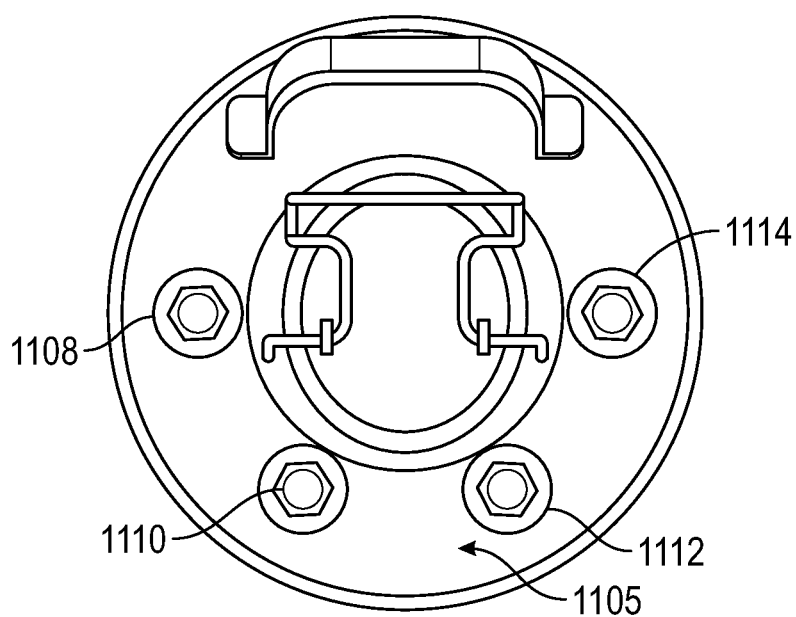
FIG. 11B depicts top view of an exemplary vessel.

FIGS. 11A-11B provide an exemplary top view and side view of an exemplary vessel 116 according to one or more non-limiting embodiments. In a non-limiting embodiment, the vessel 116 may be an ASME dispensing vessel and may be a model 180 ASME dispensing vessel. The vessel 116 may have at least an 18 inch inside diameter. In a non-limiting embodiment, the aging vessel 116 may be made of stainless steel. Further, in a non-limiting embodiment, the aging vessel 116 is designed to withstand at least a 140 psi working pressure, as it is an important step within the system 100 shown in FIG. 1 that pressurized air is added to aging vessel 116 when the aging spirit and wood mixture 118 is located inside of the aging vessel 116.

As shown in FIG. 11A and FIG. 11B, the vessel 116 may include a larger circular or oval opening 1102 that when opened, leads into an empty interior cavity of the vessel 116. The vessel 116 may be enclosed and when the opening 1102 is closed, the vessel 116 is sealed and not accessible except via one or more ports 1108, 1110, 1112, and 1114. The one or more ports 1108, 1110, 1112, and 1114 allow access via one or more conduits 130 and connector couplers 134 (e.g., as shown in FIG. 3). The one or more ports 1108, 1110, 1112, and 1114 may be positioned in a non-limiting embodiment on the top surface 1105 of the vessel 116, as shown in FIGS. 11A-11B.

The interior of the vessel 116 may have a separate channel from one of the ports, such as port 1114, that leads to an exit 1116 of the vessel 116 through an exterior bottom surface 1118 of the vessel 116. As further explained below, each port on the top surface 1105 of the vessel 116 may have a function that correlates to one of four main steps for rapidly aging the unaged distilled spirit or moonshine 110. A first port 1108 may be used to add filtered, pressurized air to the vessel 116 for a first period of time, as shown in step 804 and step 806 of FIG. 8, when a conduit 130 is coupled from the air compressor 120 to the first port 1108. A second port 1110 may be used to release the filtered, pressurized air for a second period of time from the vessel 116 as shown in step 808 of FIG. 8. A third port 1112 may be used to vacuum the vessel 116 for a third period of time when another conduit 130 is coupled to a vacuum pump 136 as shown in step 810 in FIG. 8 when another conduit 130 is coupled to the third port 1112. A fourth port 1114 may be used to release the vacuum as shown in step 812 in FIG. 8 after a fourth period of time. FIG. 3 shows port 1114 as an example that the ports are located on vessel 116a for performing any steps shown in FIG. 8. Each vessel 116a, 116b, 116c, and 116d may have at least four ports 1108, 1110, 1112, and 1114 for the conduits 130 and respective solenoid valves 124 to couple to each vessel 116a, 116b, 116c, and 116d to perform the four sequences shown in FIG. 8 (encompassed in steps 804-812).

Figure 10:
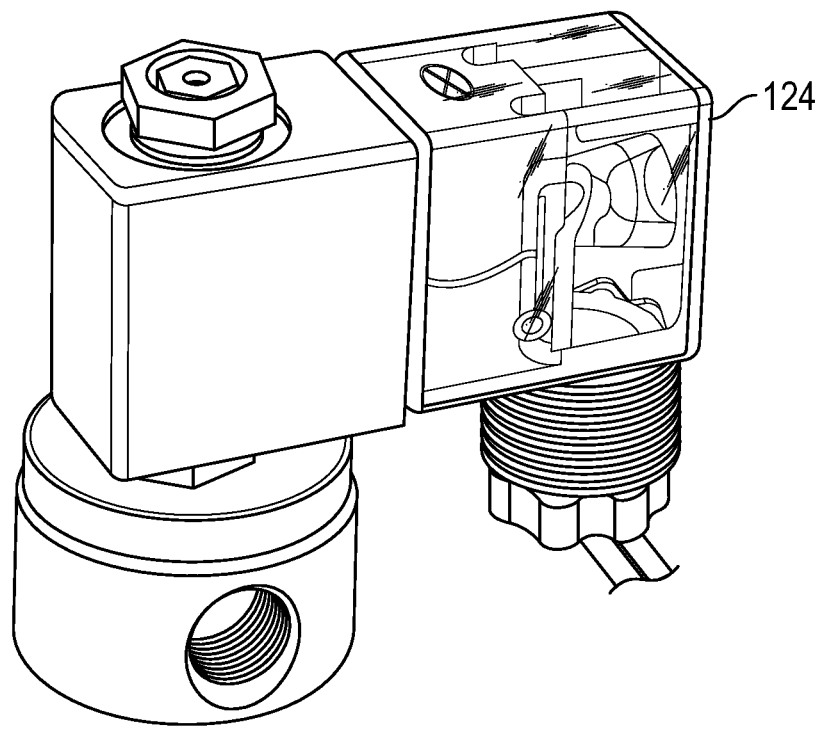
FIG. 10 depicts an exemplary solenoid valve.

FIG. 10 shows a non-limiting example of a solenoid valve 124 that may be used to perform one or more steps described herein, including pressurizing and vacuuming the mixing spirit and wood contents 118 of the aging vessel 116. In a non-limiting, purely exemplary embodiment, the solenoid valve 124 may be a two way, direct acting type of solenoid valve. Further, the operating pressure vacuum may rate at 200 psi vacuum to 150 psi in a non-limiting embodiment for a solenoid valve 124 utilized as part of the system 100 and method described herein according to one or more non-limiting embodiments.

Further, in one or more non-limiting embodiments, the solenoid valve 124 may be a normally closed solenoid valve. In a non-limiting, exemplary embodiment, the solenoid valve 124 may include a coil, coil housing, plunger, compensating seal, compensating spring, valve body, body orifice seal, O-ring body seal, plunger return spring, inlet port, and an outlet port. A normally closed solenoid valve 124 stops or starts the flow of fluids, whether liquid or gas. When a normally closed solenoid valve 124 is not powered or is de-energized, the plunger in the solenoid valve 124 is down effectively sealing the inlet port of the solenoid valve 124 and preventing the flow of the fluid through the outlet port of the solenoid valve 124. Once the normally closed solenoid valve 124 is powered or energized, the magnetic field causes the plunger to rise and to open, which unseals the solenoid valve 124 and allows the flow, such as air, to pass through the inlet port and through the outlet port. The solenoid valve 124 is controlled by an electrical current that passes through the solenoid valve 124.

One or more lead wires may be used to connect the solenoid valves 124 to the relay controller board 126 having a number of relays 128, as shown in FIG. 1. Relays 128 are electrically operated switches that include a set of input terminals for a single or multiple control signals, and a set of operating contact terminals. The relays 128 may have any number of contacts (e.g., 706, 708, 710, and 712 shown in FIG. 7) on the relay controller board 126 to control energizing and de-energizing the solenoid valves 124 for each aging vessel 116 to allow fluid, such as air, to flow into or out of the aging vessels 116 through one or more conduits 130, such as the conduits shown in FIG. 3. Accordingly, the relays 128 are intended to be in electrical communication with the solenoid valves 124 and are positioned on an electrical circuit board, such as a relay controller board 126. Lead wires from the relays 128 connect with designated attachment points on each solenoid valve 124 in order for the relays 128 to be in electrical communication with the solenoid valves 124 in order to energize and de-energize the solenoid valves 124 when the relays 128 are turned on or off by the signals controlling the relays 128 from the rapidly aging application 114.

Figure 6:
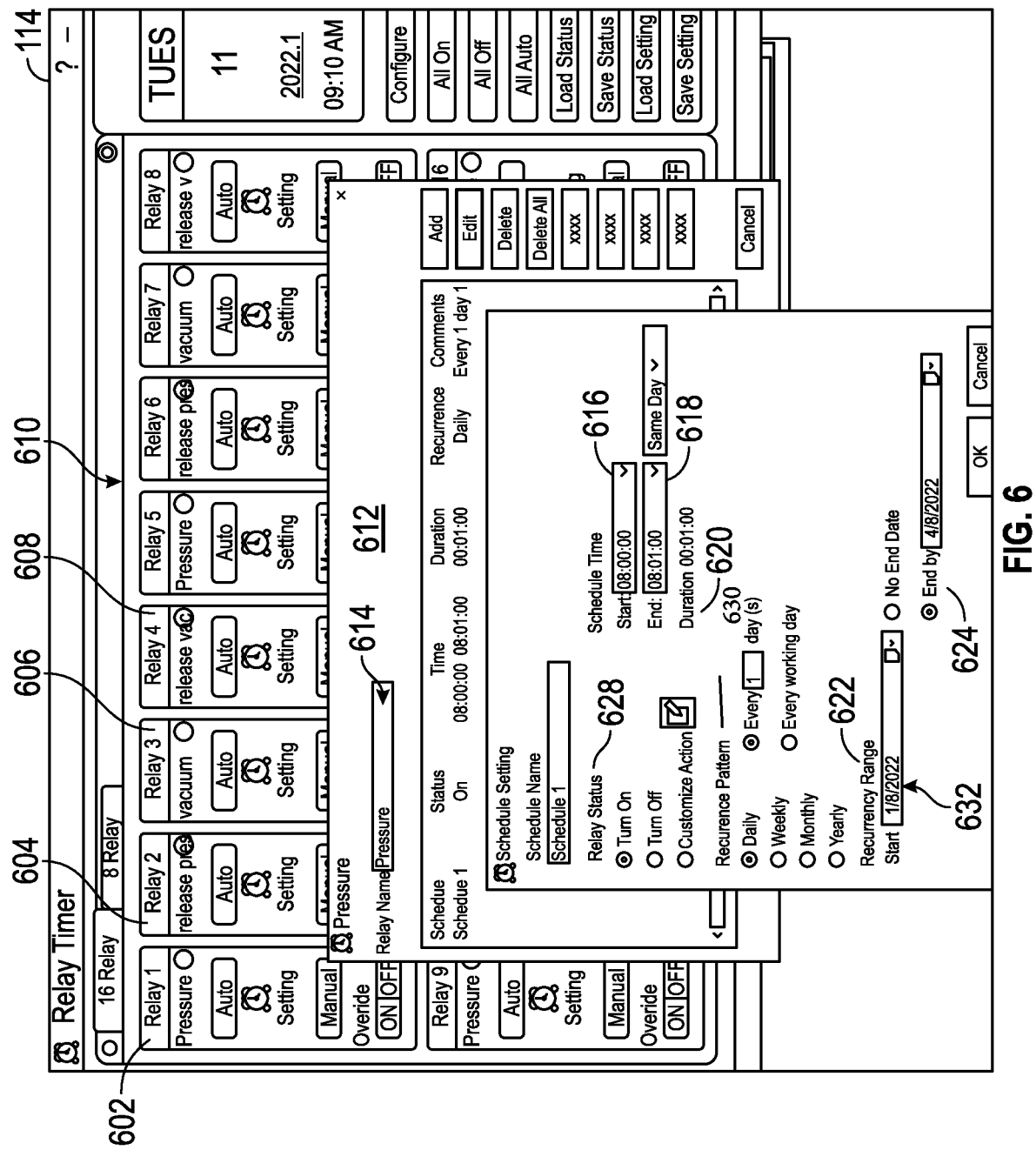
FIG. 6 depicts a computer application interface for controlling the relays of the relay controller board to activate one or more components in the rapid aging process.

The rapid aging application 114 is accessed from one or more user computing devices 112 to control each relay 128 and engage a relay 128 to turn on or off a solenoid valve 124 for a particular duration of time and to schedule a recurring sequencing pattern. An exemplary interface 610 of the rapid aging application 114 that may be used to control each relay 128 according to a particular rapid aging schedule is shown in FIG. 6 and further discussed below. FIG. 1, therefore, broadly illustrates how individual system elements making up exemplary system 100 as shown in FIG. 1 may be implemented in a relatively more integrated manner.

Figure 2:
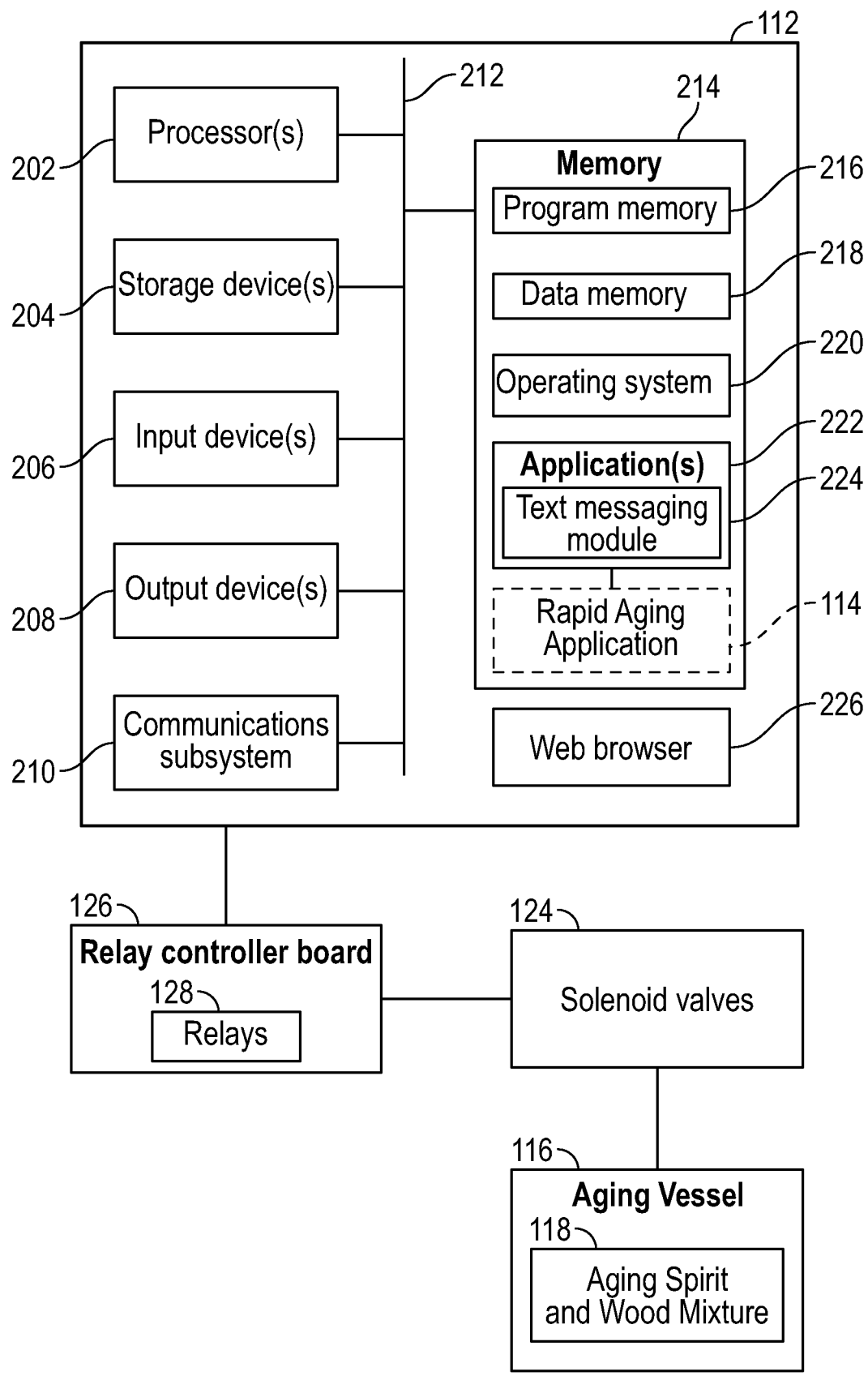
FIG. 2 depicts a block diagram for a system having a computing device with one or more components of the computing device in operation with components of the system for rapidly aging ethanol.

FIG. 2 provides a block diagram of exemplary components of a computing device 112 and rapid aging application 114 used as a part of system 100 according to one or more non-limiting embodiments. FIG. 2 illustrates an exemplary system for one or more user computing devices 112 and the various exemplary components that may be employed in practicing one or more non-limiting embodiments of the invention as described herein. FIG. 2 is meant only to provide a generalized illustration of various components, any or all of which may be utilized as appropriate.

User device 112 may be any type of information handling system, including, but not limited to, any type of computing device as noted above. To reiterate, this may include small handheld devices, such as handheld computer/mobile telephones or may include large mainframe systems, such as a mainframe computer. Further examples of handheld computing devices may include personal digital assistants (PDAs), personal entertainment devices, such as MP3 players, portable televisions, and compact disc players. Other examples of user devices 112 may include, but are not limited to, laptops, notebooks, workstation computers, personal computer systems, as well as servers. User devices 112 can be used by various parties described herein and may be connected on a computer network. Types of computer networks that can be used to interconnect the various information handling systems may include, but are not limited to, Local Area Networks (LANs), Wireless Local Area Networks (WLANs), the Internet (e.g., World Wide Web), the Public Switched Telephone Network (PSTN), other wireless networks, and any other network topology that can be used to interconnect the information handling systems.

The user device 112 is shown comprising hardware elements that can be electrically coupled via a bus 212 (or may otherwise be in communication, as appropriate). The hardware elements of user device 112 may include one or more processors 202, including without limitation one or more general-purpose processors and/or one or more special-purpose processors (such as digital signal processing chips, graphics acceleration processors, and/or the like). User device 112 may further include one or more input devices 206, which can include without limitation one or more cameras, sensors (including inertial sensors), a mouse, a keyboard and/or the like. Further, user device 112 may include one or more output devices 208 such as the device display. Furthermore, in some embodiments an input device 206 and an output device 208 of user device 112 may be integrated, for example, in a touch screen or capacitive display as commonly found on mobile computing devices as well as desktop computers and laptops.

The user device 112 may further include (and/or be in communication with) one or more non-transitory storage devices 204, which can comprise, without limitation, local and/or network accessible storage, and/or can include, without limitation, a disk drive, a drive array, an optical storage device, a solid-state storage device such as a random-access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices 204 may be non-volatile data storage devices in one or more non-limiting embodiments. Further, user device 112 may be able to access removable nonvolatile storage devices 204 that can be shared among two or more information handling systems (e.g., computing devices) using various techniques, such as connecting the removable nonvolatile storage device 204 to a USB port or other connector of the information handling systems.

The user device 112 might also include a communications subsystem 210, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 210 may permit data to be exchanged with a network, other computer systems, and/or any other devices.

Processors 202 may have access to a memory such as memory 214. Memory 214 may include one or more of various hardware devices for volatile and non-volatile storage and may include both read-only and writable memory. For example, memory 214 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 214 is not a propagating signal divorced from underlying hardware; a memory is thus non-transitory. Memory 214 may include program memory such as program memory 216 capable of storing programs and software, such as operating system 220, applications 222, including a text messaging module 224, and other computerized programs or application programs. Memory 214 may also include data memory such as data memory 218 that may include database query results, configuration data, settings, user options or preferences, etc., which may be provided to program memory 216 or any element of computing device 112.

The user device 112 can also comprise software elements, shown as being currently located within memory 214, including an operating system 220, device drivers, executable libraries, and/or other code, such as one or more application programs 222, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt user device 112 to perform one or more operations in accordance with the described methods.

A set of instructions and/or code might be stored on a computer-readable storage medium, such as the storage device(s) 204 described above. In some cases, the storage medium might be incorporated within a computer system, such as user device 112. In other embodiments, the storage medium might be separate from user device 112 (e.g., a removable medium, such as a compact disc or USB stick), and/or provided in an installation package, such that the storage medium can be used to program, configure, and/or adapt a general-purpose computer with the instructions/code stored thereon. These instructions might take the form of executable code, which is executable by the user device 112 and/or might take the form of source and/or installable code, which, upon compilation and/or installation on the user device 112 (i.e., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the user device 112) to perform methods in accordance with the disclosure. For example, some or all of the procedures of the described methods may be performed by the user device 112 in response to one or more processors 202 executing one or more sequences of one or more instructions (which might be incorporated into the operating system 220 and/or other code, such as an application program 222) contained in the memory 214. Such instructions may be read into the memory 214 from another computer-readable medium, such as one or more of the storage device(s) 204. Merely by way of example, execution of the sequences of instructions contained in the memory 214 might cause the one or more processors 202 to perform one or more procedures of the methods described herein.

The terms "machine-readable medium" and "computer-readable medium," as used herein, refer to any medium that participates in providing data that causes a machine to operate in a specific fashion. In an embodiment implemented using the user device 112, various computer-readable media might be involved in providing instructions/code to the one or more processors 202 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks, such as the storage device(s) 204. Volatile media include, without limitation, dynamic memory, such as memory included in the memory 214. Transmission media may include, without limitation, coaxial cables, copper wire and fiber optics, including the wires that comprise the bus 212, as well as the various components of the communications subsystem 210 (and/or the media by which the communications subsystem 210 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 202 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the user device 112. These signals, which might be in the form of electromagnetic signals, acoustic signals, optical signals and/or the like, are all examples of carrier waves on which instructions can be encoded, in accordance with various embodiments of the invention.

The communications subsystem 210 (and/or components thereof) generally will receive the signals, and the bus 212 then might carry the signals (and/or the data, instructions, etc. carried by the signals) to the memory 214, from which the one or more processors 202 retrieves and executes the instructions. The instructions received by the memory 214 may optionally be stored on a non-transitory storage device 204 either before or after execution by the processor(s) 202.

In one or more non-limiting embodiments, a user device 112 may include a web browser such as web browser 226. Web browser 226 may be any type of web browser known in the art that may be used to access one or more web applications on user device 112.

In one or more non-limiting embodiments, rapid aging application 114 may be a software program or module configured to schedule the operation and control of connected relays 128 located on the relay controller board(s) 126 in order to turn on and off one or more solenoid valves 124 coupled to each aging vessel 116. Rapid aging application 114 may provide an interactive computer-based platform or software module that has multiple interfaces for labeling each relay 128 according to a function associated with each relay 128 (e.g., pressure, release pressure, vacuum, release vacuum, etc.). Further, the rapid aging application 114 may allow each relay 128 to be automatically controlled and function according to a schedule and a repeating, reoccurring sequence in order to create a rapidly aged spirit 132 from the mixture of unaged distilled spirit and charred wood staves 118 stored within each aging vessel 116 coupled to the relay controller board 126 and controlling relays 128. Additional information with respect to the rapid aging application 114 may be provided below with respect to the description for FIG. 6.

In one or more non-limiting embodiments, rapid aging application 114 may alternatively be a downloadable software module that is capable of being stored directly on a computing device, such as computing devices 112 or on any device and may be a web service.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Figure 5:
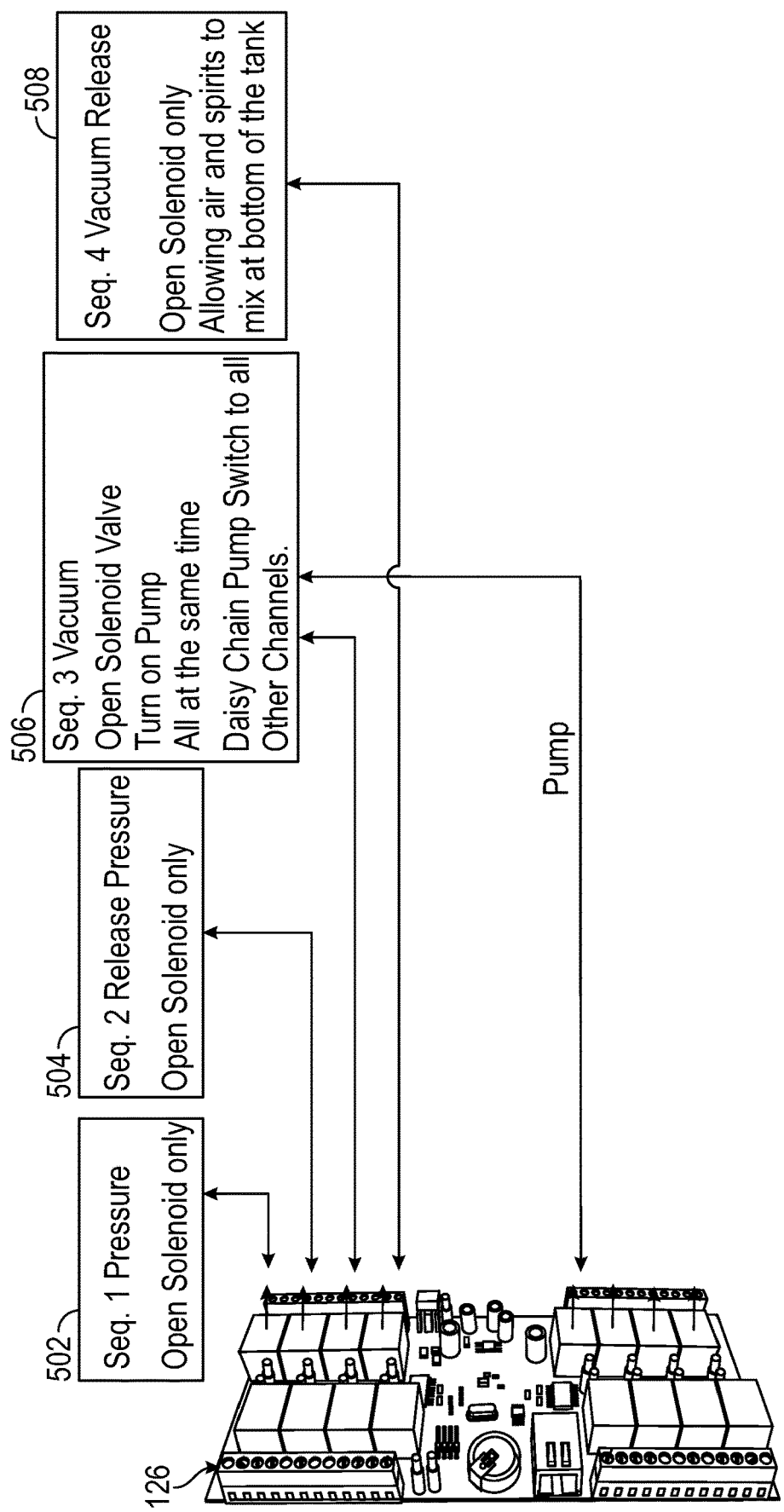
FIG. 5 depicts a pictorial illustration and flowchart of a relay controller board and one or more steps of the rapid aging process.

FIG. 3 shows a pictorial illustration of an exemplary system 100 for rapidly aging unaged distilled spirit or moonshine 110 in combination with charred wood staves 108 in one or more aging vessels 116 and FIG. 4 provides a schematic of the same components of FIG. 3. FIG. 5 provides a flowchart of a sequence of steps 502-508 that correlate with the functions of the components shown in FIGS. 3-4.

It is noted that while a user/distiller can use the system 100 and process mentioned above to create a rapidly aged distilled spirit 132 in one single vessel 116, the system 100 is also able to handle multiple processing vessels 116 at the same time for purpose of creating a much greater amount of product (i.e., rapidly aged spirits 132). FIG. 3 and FIG. 4 provide an example of four processing vessels 116. In a non-limiting embodiment, each processing vessel 116*a*, 116*b*, 116*c*, and 116*d*, as shown in FIGS. 3-4 can each have a slightly different recipe or combination of unaged distilled spirit and types of wood barrels 106 utilized according to each product that is in production in the aging vessels 116. In other embodiments, each processing vessel 116 may comprise the same combination of mixture 118 and follow a same recipe to produce a same kind of rapidly aged spirit 132.

As shown in FIG. 3, the processing vessels 116a-116d may be positioned relatively close together. The air compressor 120 with filter 122 and filter box 123 may also be positioned relatively close to the processing vessels 116a-116d as is the vacuum pump 136 shown in FIG. 4. Accordingly, all of these components of system 100 as shown in FIGS. 1-3 may be contained within a same facility, and in a same room/hall even for easy access and visibility.

A container, as shown in FIG. 3 holding unaged spirit/moonshine 110 may be proximately located near to each vessel 116 in order for the unaged spirit/moonshine 110 to flow from the moonshine container to each vessel 116 before a rapid aging sequencing is begun for a particular vessel 116. In a non-limiting embodiment, a user can pour a desired amount of unaged spirit/moonshine 110 directly into each aging vessel 116 using measuring devices and containers having the desired amount of unaged spirit/moonshine 110. Alternatively, or additionally, the unaged spirit/moonshine 110 can be pumped into each vessel 116 from a larger container housing enough moonshine 110 for each vessel (e.g., vessels 116a, 116b, 116c, and 116d).

A shown in FIG. 3, there are a myriad of pipes, tubes, and/or other types of conduits 130 that allow fluid to flow in and out of the vessels 116, including either liquid fluid such as the moonshine 110 or air.

As noted above, pressurized, filtered air can be directed into and allowed to flow through a conduit 302 to each vessel 116a-116d when needed. Further, the pressurized filtered air can then be flowed out of each vessel 116a-116d via one or more conduits 302 when applicable in the series of steps to produce the rapidly aged spirit 132. Further, air can be directed outside to vent as shown at 402 and 404 in FIG. 4 via one or more conduits 130 from the released air or vacuumed air. FIG. 3 additionally shows an exemplary relay controller board 126 which is adapted to hold a number of relays 128 that control via opening or closing any solenoid valves 124 coupled to the appropriate conduits 130 to allow fluids, such as air, to flow into or out of each vessel 116a-116d.

FIG. 4 shows schematically a position of one or more components of system 100. A series of arrows as shown in FIG. 4 may show one or more paths for air flowing into and out of each exemplary vessel 116a, 116b, 116c, and 116d. In some cases, pressurized, filtered air is directed from air compressor 120 to each vessel 116 when the first solenoid valve 124a for each vessel 116 is activated to allow pressurized, filtered air to flow into each vessel at a scheduled period of time. Step 502 in FIG. 5 depicts that the relay controller board 126 includes a particular relay for turning on and off the first solenoid valve 124 to allow pressurized, filtered air to flow into each vessel 116 at a scheduled set time and for a scheduled set duration (as scheduled using the rapid aging application 114). As noted above, the pressurized filter air may flow into each vessel 116 to cause the unaged distilled spirit or moonshine 110 to infuse with the particular type of charred wood staves 108 in the aging vessel 116.

Further, as shown in FIG. 4, a second solenoid valve 124b coupled to each vessel 116 via one or more conduits 302 may be activated to release the filtered, pressurized air which may then be directed via a conduit 130 to vent outside 404. The one or more conduits 130 may be pipes and tubes that include an empty interior cavity that allows for fluid flow to flow through each conduit 130.

It is noted that the term "outside" as used in this context may refer to the environment in an outside open environment or may refer to another room/hall/area other than where the processing vessels 116a-116d are kept. FIG. 5 includes step 504 which corroborates that the second solenoid valve 124b that is controlled by a particular relay 128 on the relay controller board 126 may be activated to allow the pressurized air to vent elsewhere and travel out of the processing vessel 116 via one or more conduits 130.

In a non-limiting embodiment, a third solenoid valve 124c, as shown in FIG. 4, that is coupled to each vessel 116 via one or more conduits 130 may be activated at the same time as a vacuum pump 136 is turned on in order to create a vacuum within the processing vessels 116 and vacuum out any remaining air out of the processing vessel 116 for a third designated period of time. As noted above, it may be desirable to achieve a medium vacuum within a particular, exemplary range of −15 to −30 psi in one or more non-limiting embodiments. While the vacuum pump 136 is turned on and the third solenoid valve 124c is engaged or open at the same time (as shown at step/sequence 506 in FIG. 5), the vacuumed air may be directed out through a conduit 130 and vented outside 402 as shown in FIG. 4. In a non-limiting embodiment, each vessel 116 is separately vacuumed and controlled by the processing rapidly aging software 114 to vacuum any air out of each vessel 116 according to a specific sequence and timeline.

In another embodiment, as shown in FIG. 5, the vacuum pump 136 may be daisy chained or coordinated so that the vacuum pump 136 can simultaneously or almost simultaneously vacuum out air from multiple vessels 116a-116d. This may be possible because a same conduit 130 may be linked to all the vessels 116 and to a designated port (e.g., port 1112 of FIG. 11B) on the vessel 116.

Further, in a non-limiting embodiment, as part of the method and process, a fourth solenoid valve 124d coupled to a processing vessel 116a, as shown in FIG. 4 may be turned on to quickly release the vacuum which causes a disturbance and violent agitation in the processing vessel 116 allowing the mixing spirit 118 to further mix with any remaining air and unaged distilled spirit/moonshine 110 with the air bubbles in the processing vessel 116 at an interior bottom area 1106 of the vessel 116. Step 508 in FIG. 5 (and step 812 in FIG. 8) indicates that this vacuum release is performed subsequent to the vacuuming step 506 and as shown in FIG. 4, a fourth solenoid valve 124d for each processing vessel 116a-116d, in one or more non-limiting embodiments, may be configured to perform step 508 to cause a vacuum release which causes agitation of the mixture 118 in each vessel 116.

It is noted that, in a non-limiting embodiment, the air compressor 120 is controlled by its own pressure switch. When the tank pressure in the vessel 116 drops below a particular pressure level (e.g., 80 psi), the air compressor 120 turns on until the second particular level (e.g., 120 psi) is reached and then the air compressor 120 turns off.

In a non-limiting embodiment, the operation of the vacuum pump 136 is controlled by the rapid aging application 114 and the relay controller board 126 shown in FIG. 1 and FIGS. 5-7, which may be programmed to automatically turn on and off by the rapid aging application 114 and the relay controller board 126.

Figure 8:
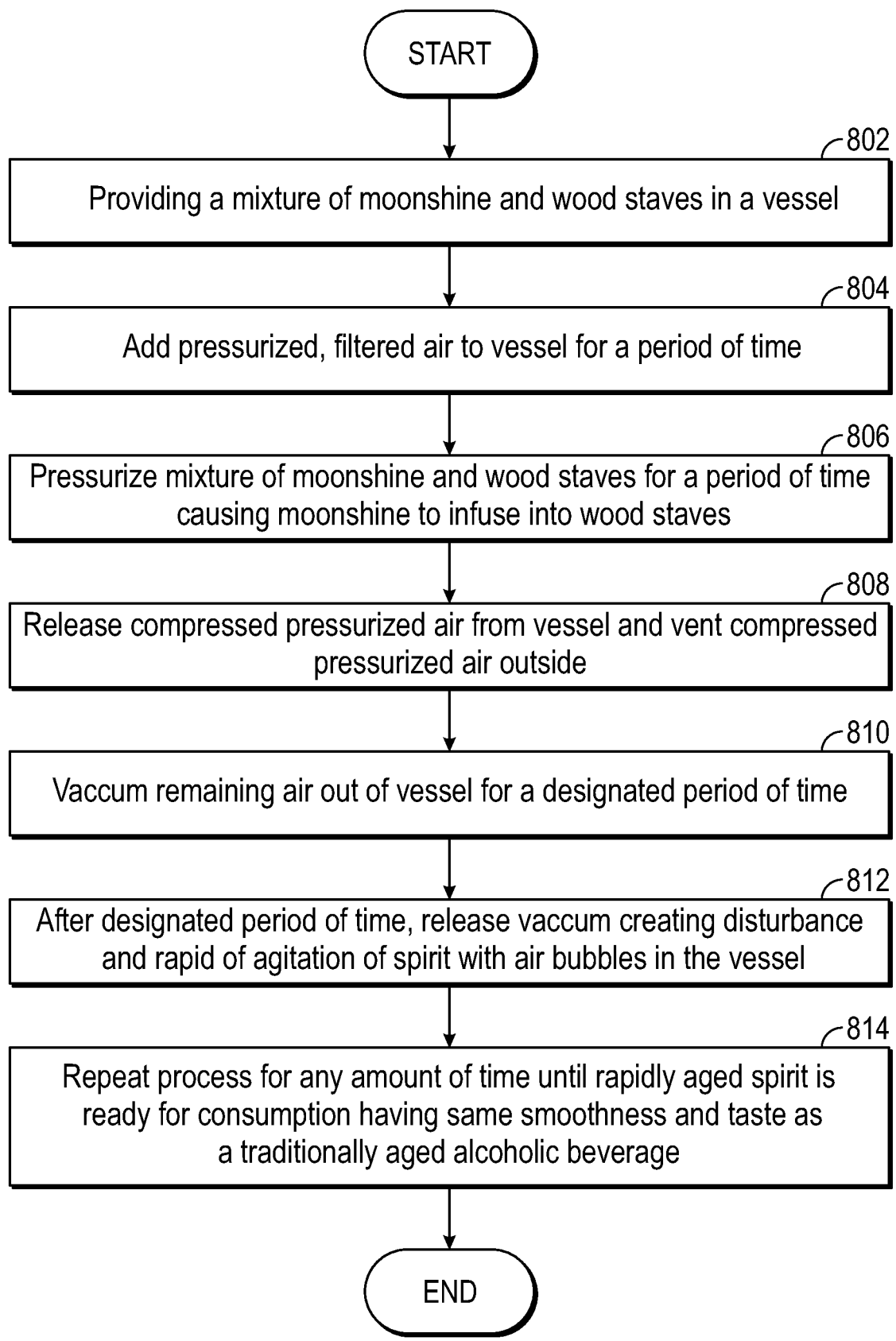
FIG. 8 depicts a flowchart for a rapid aging process for rapidly aging spirits.

The step 508 of quickly releasing the vacuum may be essential to the rapid aging and maturation process of converting the unaged distilled spirit 110 into the rapidly aged spirit 132 (as shown in FIG. 1). A goal of maturation/rapidly aging the unaged distilled spirit 110 is to remove harsh flavors from the raw alcohol 110 while adding distinct flavor characteristics found in the wood staves 108. The step of quick releasing of the vacuum (e.g., step 508 shown in FIG. 5 and step 812 shown in FIG. 8) is a unique feature of the present description that rapidly releases oxygen back into the vessel 116 and assists any oxygen in reacting with the aging spirit 118 in the vessel 116. Oxidation plays a key role in the aging and maturation process of the aging spirit 118 by changing the flavors and slowly breaking down the alcohol molecules of the aging spirit 118 and any tannins from the oak. Also, an additional benefit of the step 508 as shown in FIG. 5 and step 812 as shown in FIG. 8 of quick releasing of the vacuum provides a way to mix the spirit 118 daily for each vessel 116. The aging portion of this spirit 118 is very close to the wood staves 108, therefore the mixing of the aging spirit 118 in the aging vessel 116 every day or as programmed otherwise using the computer application 114 provides a better balance of spirits 118 being pushed into the wood staves 108 and aging to achieve a better flavor that resembles traditionally aged spirits in wood barrels, such as scotch, rye, bourbon, whiskey, etc. Accordingly, an entire portion of the aging mixture 118 is fully exposed to the wood staves 108 in the aging vessel 116 and pushed in and out of the wood staves 108 for improved flavor over a faster period of time.

Accordingly, as shown in FIG. 4, in a non-limiting embodiment, each processing vessel may each have its own set of four solenoid valves 124a-124d with each solenoid valve dedicated to a particular function and purpose in the rapid aging process and system 100. The turning on and off of each solenoid valve 124a-124d for each processing vessel 116 may be controlled by a particular set of relays 128 on the relay controller board 126 that are instructed to open or close by the rapid aging application 114 and the programmed schedule for each relay 128 as set via the rapid aging application 114.

FIG. 4 further shows an overflow holding tank 408 coupled to its own filter 410. The overflow holding tank 408, shown in FIG. 4, is meant to capture all aging spirits draining from one of the four vessels 116a-116b. This will only occur if the fourth solenoid valve 124d associated with any processing vessel 116a-116d does not close properly and the first solenoid valve 124a also turns on and adds pressurized air from the air compressor 120. The overflow holding tank 408 has its own air filter 410 for all air being sucked back into any one of the four vessels 116a-116b currently undergoing the vacuum release process in order to ensure the air directed back into the vessels 116a-116b after the vacuum release (step 508 in FIG. 5) is filtered of impurities.

Figure 7:
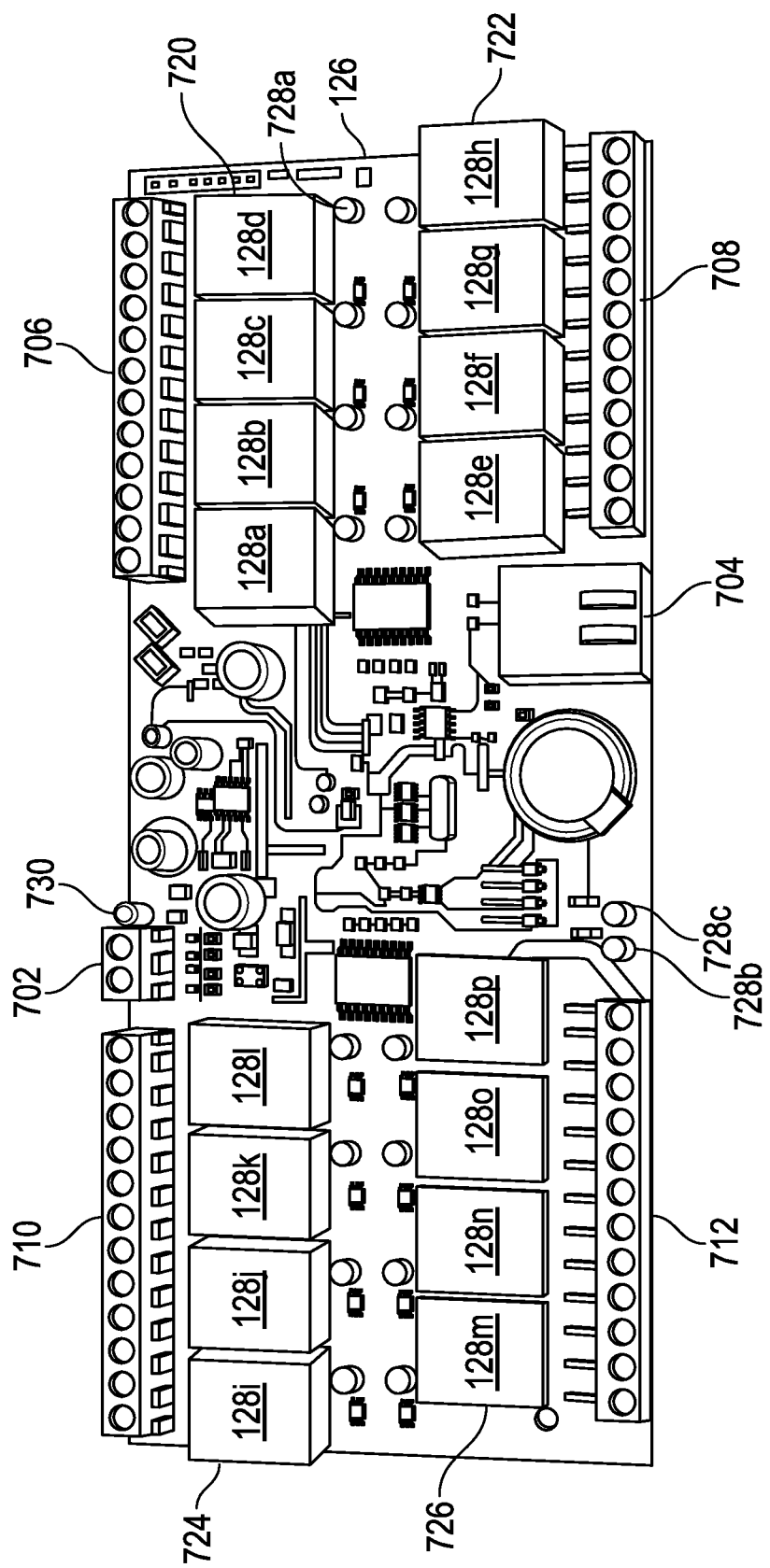
FIG. 7 depicts a relay controller board.

FIG. 6 shows an exemplary interface of a computing application such as rapid aging application 114 for the purposes of controlling one or more actions of each relay 128 on the relay controller board 126, an example of which is shown in FIG. 7. The rapid aging application 114 acts as a computer implemented scheduler that can schedule the start time 616 and end time 618 for each relay 128 to be activated as well as the duration 620. In a non-limiting embodiment, a set of four relays (e.g., 602, 604, 606, and 608) are dedicated to and control one aging vessel 116 filled with the mixture 118 of unaged spirit (ethanol spirits or moonshine 110) and wood staves 108. Every relay 128 has a scheduled recurrence range 622 of activity. The rapid aging application 114 controls each relay 128 (e.g., 602, 604, 606, and 608) individually and each relay 128 can be named by its function. The interface 612 shown in FIG. 6 includes such exemplary selections via one or more drop down menus or other user interface options to set a schedule for each relay 128 whereby each relay 128 is associated with a specific solenoid valve 124, such as solenoid valves 124a-124d shown in FIG. 4 in order to perform the steps described above, including but not limited to, allowing filtered, pressurized air to flow into each vessel with the mixing unaged distilled spirit and charred wood staves 118 from an air compressor 120 or vacuuming out the remaining air inside the vessel 116 using a vacuum pump 136 and causing a quick release of the vacuum thereby causing an agitation of the mixture 118 in the vessel 116.

There may be a number of relays 128 that are all programmable on the user interface 610 including, but not limited to relay interfaces 602, 604, 606, and 608. Each relay interface 602, 606, 606, and 608 represents functions and aspects related to each actual relay 128 on a relay controller board 126. As shown in FIG. 6, the computing application 114 includes a dedicated interface for a 16-relay grouping or an 8-relay grouping. FIG. 7 shows that there are sixteen relays 128a-128p. In a non-limiting embodiment, the relay controller board 126 in FIG. 7 includes multiple groupings or sets 720, 722, 724, 726 each having their own set of four relays 128 which are dedicated to the rapid aging for a particular vessel 116.

Grouping 720, as shown in FIG. 7, has four relays labeled as 128a, 128b, 128c, and 128d. FIG. 7 further includes grouping 722 having an additional four relays 128 which are labeled as 128e, 128f, 128g, 128h. Grouping 724 has an additional four relays 128 which are labeled as 128i, 128j, 128k, and 128l. Grouping 726 has another set of four relays 128 which are labeled as 128m, 128n, 128o, and 128p. Accordingly, relay controller board 126 as shown in FIG. 7 shows an example where sixteen relays 128 may be employed to control the rapid aging process and system 100 as applied to four separate vessels 116a, 116b, 116c, and 116d (e.g., as shown in FIG. 3 and FIG. 4).

Additionally, using rapid aging application 114, the user can provide a specific label in a designated relay name spot 614 in interface 610 of rapid aging application 114 to clearly convey the purpose of the relay 128 that the user is programming to turn on or off at set start dates/times and set end dates/times using the rapid aging application 114 and interface 610. For example, in FIG. 6, the label 614 depicts the word "pressure" which conveys to the user that the particular relay interface 602 being programmed by the rapid aging application 114 is used to control the adding of pressurized, filtered air from an air compressor 120. As shown in FIG. 6, there are other exemplary labels 614 provided for other relays including "release" for relay interface 604, "vacuum" for relay interface 606, and "release v (vacuum)" for relay interface 608. Each relay interface 602, 604, 606, and 608 has a specific function, which, respectively, may be to add pressure from compressor 120, release pressure from compressor 120, vacuum air using vacuum pump 136, and release a vacuum, and which replicate the specific functions of each actual relay 128 on the relay controller board 126 and the coupled solenoid valves 124.

Accordingly, each relay 128 on the relay controller board 126 is intended to control the energizing and de-energizing (activating and de-activating) a specific solenoid valve 124 that allows for either addition of pressurized, filtered air, releasing of the pressurized, filtered air, vacuuming out any remaining air in the vessel 116, and then releasing the vacuum. As shown in FIG. 7, and discussed further below, relays 128 may be grouped together on the relay controller board 126 so it is clear which group of relays 128 are dedicated to controlling these four separate functions or steps for each vessel 116.

The user can set the relay status 628 of each relay 128, the recurrence pattern 630, and the recurrence range 622 as shown in FIG. 6. The relay status 628, as shown in FIG. 6, may include whether a relay 128 is turned on or turned off or some other customizable action. The recurrence pattern 630 may include selectors that allow a user to choose between timings such as daily, weekly, monthly, yearly, every day, or every working day as shown in FIG. 6 according to one or more non-limiting embodiments. The recurrence range 622 for the steps of the method as described herein to apply to one or more relays 128 controlling a same vessel 116 may be set at a start date 632 and an end date 624, if so desired. The exemplary interface 610 of the rapid aging application 114 further enables the user to clearly turn on or off one or more relays 128 and to view the load status on the relay controller board 126. In a non-limiting embodiment, each vessel 116 will have steps 502-508 and 802-810 performed at least once every day (daily) for 90-120 days depending on the ideal processing time to produce a particular product or flavor.

As noted above, the relay controller board 126 shown in FIG. 7 may be an example of a sixteen relay controller board. In other embodiments, there may be more or less relays 128 utilized. Further, the user may choose to have only one vessel 116 producing any rapidly aged spirit 132, and may only operate four relays 128 for a single grouping 720 on the relay controller board 126.

The relay controller board 128 includes the relay contacts 706, 708, 710, and 712 for each set of relays 128 for each relay grouping 720, 722, 724, and 726. As noted above, a relay 128 is an electrically operated switch. Relays 128 use an electromagnet (e.g., a coil) to operate their internal mechanical switching mechanisms, which are the contacts 706, 708, 710, and 712. When a relay contact for any of the relay contacts 706, 708, 710, and 712 is open or on, this will switch power on for a circuit when the coil is activated and the circuit will be completed. If the relay contact for any of the relay contacts 706, 708, 710, and 712 is off, then the circuit will be broken.

As shown in FIG. 7, in a non-limiting embodiment, the relay controller board 126 may include an ethernet port 704 in order to couple the relay controller board 126 via a wired ethernet cord to a computing device 112 providing access or having the rapid aging application 114. Other types of networks, including WIFI, or another type of network may also be used in order for the rapid aging application 114 to be in signal communication with the relay controller board 126 and the relays 128.

Further, the relay controller board 126 may include one or more LED lights, such as LED lights 728a, 728b, and 728c that indicate when a relay 128 is on. The relay controller board 126 may further include a power supply jack 702 to provide power from a power source to the relay controller board 126 as well as a power LED 730 to visually indicate to the user when the power from the power source is on and supplying power to the relay controller board 126. The relay controller board 126 may be housed in a protective electronic housing box or other type of container in order to protect the circuitry and components of the relay controller board 126.

FIG. 8 is an exemplary flowchart for a method of producing rapidly aged spirit 132 according to one or more non-limiting embodiments. At step 802, the method may include providing a mixture of unaged distilled spirit or moonshine 110 and charred wood staves 108 in a vessel 116. At step 804, the method may include adding pressurized, filtered air to the vessel 116 for a first pre-determined period of time (as supplied by the air compressor 120 coupled to a filter 122 as shown in FIG. 1). At step 806, the method may include pressurizing the mixture 118 of moonshine 110 and wood staves 108 for the first period of time and causing the moonshine 110 to infuse into the wood staves 108. At step 808, the method may include releasing the pressurized air from the vessel 116. This step may further include venting the pressurized air outside or elsewhere in one or more non-limiting embodiments. At step 810, the method may further include vacuuming any remaining air out of the vessel 116 for a third designated and scheduled period of time. At step 812, after the designated period of time for step 810 has passed, the method may include releasing the vacuum in the vessel 116, thereby creating a disturbance and rapid agitation of the moonshine 110 with air bubbles in the bottom of the vessel 116. At step 814, the process may be repeated for any amount of time until a rapidly aged spirit 132 is ready for consumption. In one or more non-limiting embodiments, the produced rapidly aged spirit 132 may have the same smoothness and taste as a traditionally aged alcoholic beverage. It is noted that the periods of times for the steps 802-814 is scheduled using the rapid aging application 114, which may have one or more interfaces 610 as shown in FIG. 6 for controlling one or more relays 128 to energize and de-energize solenoid valves 124 that allow the fluid flow in and out of the vessel 116 at scheduled times. Further, in one or more non-limiting embodiment, each vessel 116 undergoes each step 802-810 everyday for 90-120 days. Accordingly, every day for 90-120 days, each vessel 116 will have pressurized air added to the vessel 116 from the air compressor 120, the pressurized air will be released, the remaining air will be vacuumed with a vacuum pump 136, and then the vacuum is quickly released. All these sequences that are timed using the rapid aging application 114 force the aging spirit 110 to interact with the wood staves 108 and age and mature in a rapid manner.

It is noted that various recipes may be used as described below that produce different tasting final rapidly aged spirits 132. If a "bourbon-like" rapidly aged spirit 132 is desired, then the following recipe may be utilized. As a first step, the unaged distilled spirit or moonshine 110 may be proofed down from 160 proof to 135 proof before transferring to a particular aging vessel 116. Next, new American and French oak wood staves 108 are charred to a level 4 and placed into the aging vessel 116. The moonshine 110 is added to the particular aging vessel 116 with the staves 108. The aging sequence program as scheduled in the rapid aging application 114 is started and set for ninety days of processing. After steps 802-814 are completed for ninety days, a "bourbon-like" rapidly aged spirit 132 may be produced having the same taste and flavor of bourbon that is traditionally aged over many years in wooden barrels.

If a "scotch like" rapidly aged spirit 132 is desired, the following recipe may be utilized to produce a rapidly aged spirit 132 that tastes like scotch and has the same quality as traditionally aged scotch. For a first step, the unaged distilled spirit or moonshine 110 may be proofed down from 160 proof to 135 proof before transferring to a particular aging vessel 116. Used American and French oak wood staves 108 that were used for the production of the "bourbon like" rapidly aging spirit 132 are kept or placed in another vessel 116 and used for the rapid aging process to develop a "scotch like" rapidly aged spirit 132. Additional moonshine 110 is added to the vessel 116 with the used American and French oak wood staves 108, and the aging sequence program 114 is started in conjunction with the designated relays 128 and solenoid valves 124 and set for ninety days for processing. At the end of ninety days, a "scotch like" rapidly aged spirit 132 is produced.

Various other tasting rapidly aged spirits 132 may also be produced. In one embodiment, which may be referred to as a northwest umber devils cut, upon completion of ninety days processing to develop the "bourbon like" rapidly aged spirit 132, the produced "bourbon like" rapidly aged spirit 132 is completely drained from the vessel 116. Any used oak wood staves 108 are kept inside of the vessel 116 and no aging sequence program is started. Approximately three weeks after the vessel 116 is drained, the remaining mixture 118 of spirit 110 and staves 108 slowly run down to the bottom of the vessel 116 and is collected. This intense chemical reaction between the small amount of spirit 110 and large amount of wood 108 creates a highly desired product.

In another embodiment, a "brandy like" rapidly aged spirit 132 may be created using the rapid aging system 100 shown in FIG. 1 and described above. As a first step, the user may clean the vessel 116 before use. Moonshine 110 is proofed down from 160 proof to 135 proof before transferring to aging vessel 116. Next, new American and French oak wood staves are charred to level 4 and placed into the vessel 116. Moonshine 110 is added to the vessel 116, and the aging sequence program is started and set for ninety days of processing. The output and end result of the rapid aging sequence is a "brandy like" rapidly aged spirit 132.

In another embodiment, a "rye like" rapidly aged spirit 132 may be created using the rapid aging system 100 shown in FIG. 1 and described above. Moonshine 110 is proofed down from 160 proof to 135 proof before transferring to an aging vessel 116. New American and French oak wood staves 108 are charred to level 4 and placed into the vessel 116. Moonshine 110 is added to the vessel 116 and the aging sequence program is started and set for ninety days of processing.

In a non-limiting embodiment, the number of wood staves 108 needed per vessel 116 is less than one full wooden barrel 106, but it does depend upon the recipe as well for the quantity. Some rapidly aging spirits 132 utilize about 7-9 staves per vessel 116 and some may use approximately 3-5 new staves added per vessel 116 depending upon the recipe for the particular rapidly aged spirit 132. Notably, FIG. 1, FIG. 4, and FIG. 5 as shown and as presented above relate to an open system for rapidly aging an undistilled spirit 110 in order to become a rapidly aged distilled spirit 132.

Various other types of recipes may be utilized to produce different intensities of rapidly aging spirit 132 and flavors, but all of which are produced in a much cleaner, quicker manner than traditionally aged spirits.

Figure 12:
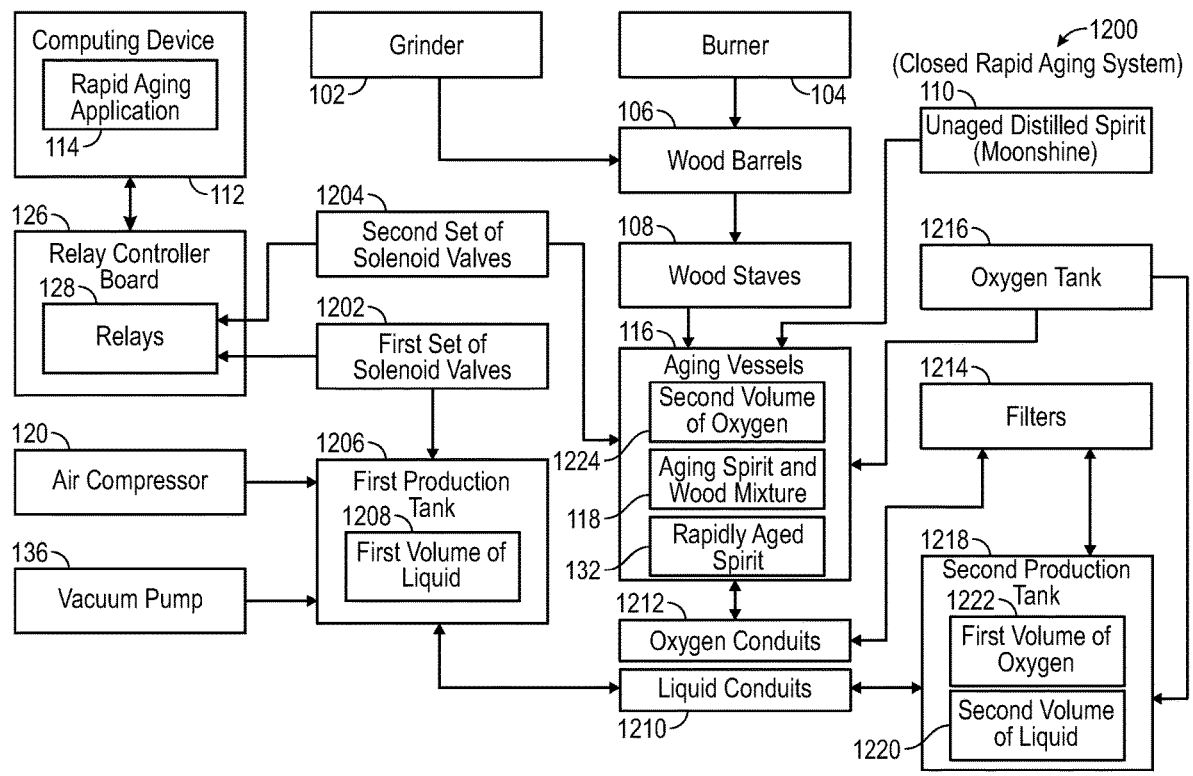
FIG. 12 depicts a block diagram for an exemplary closed rapid aging system.
Figure 13:
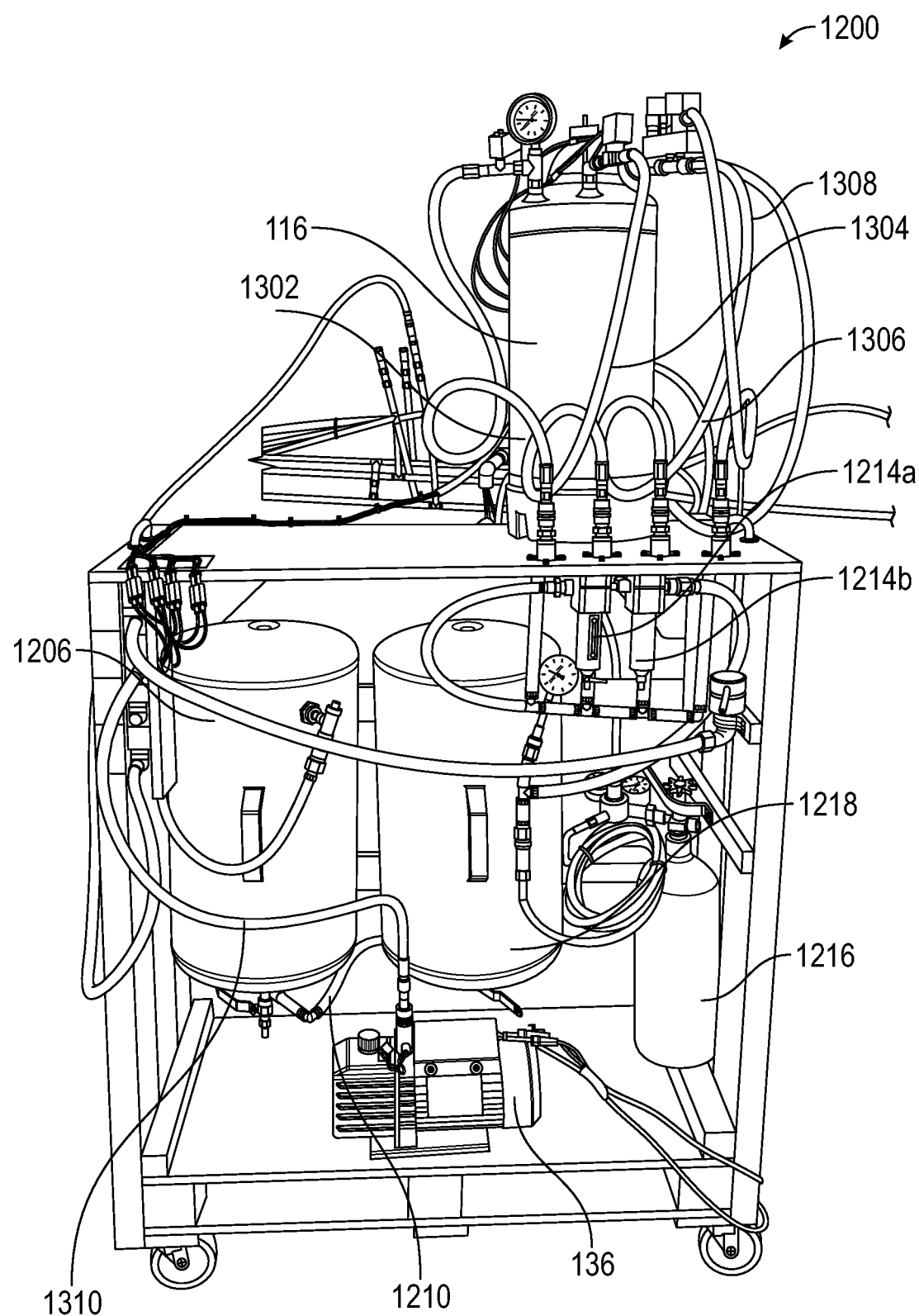
FIG. 13 depicts a pictorial illustration of some components of an exemplary closed rapid aging system.
Figure 14:
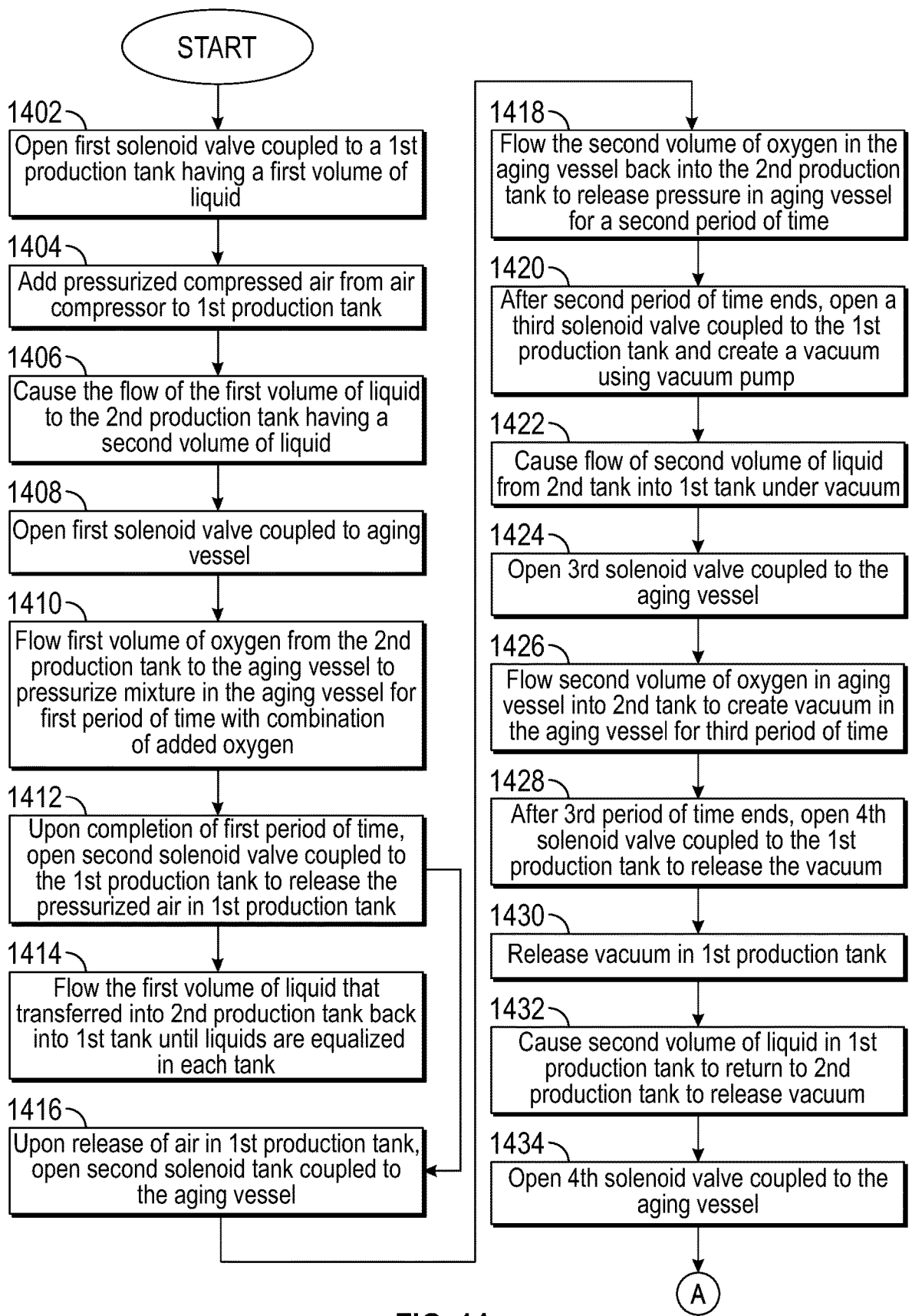
FIG. 14 depicts a flowchart for an exemplary process for a closed rapid aging system.

Turning to FIGS. 12-14, FIGS. 12-14 describe a closed system for rapidly aging an undistilled spirit 110 that is put into an aging vessel 116 in order to create a rapidly aged distilled spirit 132. Advantageously, the closed rapid aging system 1200 as shown in FIGS. 12-14 may allow for minimal vapor loss and alcohol loss from the rapidly aging vessel 116 that may occur with the open system 100 shown in FIG. 1 and with any type of traditional aging in a wooden barrel, such as wooden barrel 106. It is estimated that an average spirit loss of 2 to 4% loss per year per 52-gallon barrel (e.g., wooden barrel 106) is common for traditional aging systems for creating a bourbon, scotch, or rye, or other type of aged spirit, which can be very costly for manufacturers and wasteful of the aging spirit 118.

Accordingly, there is a need for a closed system for rapidly aging an undistilled spirit 110, such as the closed system 1200 shown in FIG. 12, that will allow virtually no or minimal vapor loss to produce a maximum amount of rapidly aged spirit 132. Because in the closed system 1200, shown in FIGS. 12-14, the interior air and/or oxygen in the aging vessel(s) 116 is not released to the outside environment, there is virtually no vapor loss of the rapidly aged spirit 132. Rather, in the closed system 1200 shown in FIGS. 12-14, the interior air and/or oxygen is kept within the closed system 1200 and the undistilled spirit 110 is allowed to rapidly age using virtually the same interior oxygen initially pumped into the aging vessel 116, which is shown in FIG. 12 as second volume of oxygen 1224. Accordingly, when the interior oxygen (and/or air of any form) is not released to the outside environment, there may be less alcoholic vapor loss of the aging spirit and wood mixture 118, thus saving the manufacturer of the rapidly aged spirit 132 cost and expense in having to account for the vapor loss that may occur with other non-closed systems for the rapidly aged spirit 132.

One of the main differences between the closed system 1200 shown in FIG. 12 and the open system 110 shown in FIG. 1 and in FIG. 4, is that in the open system 100, compressed air provided by the air compressor 120 is directed to each aging vessel 116 (e.g., aging vessel 116a, 116b, 116c, and 116d shown in FIG. 4) and then eventually released directly from each aging vessel 116a, 116b, 116c, and 116d according to a recurring sequence to the outside environment (e.g., as shown at 404 in FIG. 4). The release of the air to the outside environment in the open system 100 may lead to some amount of vapor loss. In contrast, in the closed rapid system 1200 of FIG. 12, there is much less to virtually no vapor loss because there is no releasing of air to the outside environment from the aging vessel(s) 116 and a different system is created such that compressed air from the air compressor 120 is directed to a first production tank 1206 and any air that needs to be released to an outside environment is released only from the first production tank 1206. In a non-limiting embodiment, the air is released to an outside environment only when the second sequence begins for releasing the pressurized air provided by the air compressor 120. It is noted that the air compressor 120 is not connected to the relay.

In an overview of the closed rapid aging system 1200 shown in FIG. 12, the closed rapidly aging system 1200 features a first production tank 1206 and a second production tank 1218. The first production tank 1206 is filled halfway with a liquid (e.g., first volume of liquid 1208) and the second production tank 1218 is filled halfway with a liquid (e.g., second volume of liquid 1220). In a non-limiting embodiment, air in the form of pure oxygen provided by the oxygen tank 1216 is added to the second production tank 1218 and also to the aging vessel 116 upon starting any new processing of unaged distilled spirit 110. The first production tank 1206 has multiple connections for pressure, release, vacuum, and vacuum release (similar to the open system 100 shown in FIG. 1). In the closed system 1200 shown in FIG. 12, adding pressure or releasing pressure or creating a vacuum or releasing a vacuum causes the first volume of liquid 1208 to be pushed into and out of the second production tank 1218, and the second volume of liquid 1220 in the second production tank 1218 is also pushed into and out of the first production tank 1208 according to a particular sequence to create the processes needed for rapid aging the unaged distilled spirit 110 into rapidly aged spirit 132. In a non-limiting embodiment, the second production tank 1218 and any aging vessels 116 connected to the second production tank 1218 do not release pressure in the form of oxygen to the outside environment. The closed rapid aging system 1200 as shown in FIG. 12, and illustrated in FIG. 13, is designed to be always closed, using the same air during the duration of its aging cycle and is only released when one or more aging vessels 116 have completed their 90 to 120 days of processing to produce a drinkable rapidly aged spirit 132.

To provide further detail for FIG. 12, the grinder 102, burner 104, wood barrels 106, wood staves 108, computing device 112, rapid aging application 114, relay controller board 126, relays 128, air compressor 120, vacuum pump 136, unaged distilled spirit (moonshine) 110, aging vessels 116, aging spirit and wood mixture 118, and rapidly aging spirit 132 are the same components and function in accordance with the description provided above with respect to FIGS. 1-11B. Further, the closed rapid aging system 1200 utilizes the steps of providing compressed, pressurized air from an air compressor 120, releasing the compressed air from the air compressor, creating a vacuum using a vacuum pump 136, and releasing the vacuum pump 136 in order to rapidly age the aging spirit and wood mixture 118 just the same as the open rapid aging system 100 shown in FIG. 1 and presented in FIGS. 2-11B. Further, the closed rapid aging system 1200 releases the vacuum in order to create a disturbance of and rapid agitation of the aging mixture 118 in order to provide an improved method for rapidly aging the aging mixture 118. The computer rapid aging application 114 is programmed to trigger for designated periods of time and in a recurring pattern the corresponding relays 128 that open or close corresponding solenoid valves '123 (e.g., for the first set of solenoid valves 1202 and the second set of solenoid valves 1204 shown in FIG. 12 for the closed rapid aging system 1200) in order for a step in the rapid aging system/method 1200 to occur, in the same manner as for the open rapid aging system 100.

Notably, the closed rapid air aging system 1200 adds a first production tank 1206 having a first volume of liquid 1208 and a second production tank 1218 having a second volume of liquid 1220. The rapid aging computer application 114 is modified in the closed rapid aging system 1200 to provide pressure in the form of pressurized air, releasing pressurized air, creating a vacuum using a vacuum pump, and releasing the vacuum first to the first production tank 1206, and then the closed system 1200 utilizes the displacement of the first volume of liquid 1208 and the second volume of liquid 1220 to in turn provide pressurized air, release the pressurized air, create a vacuum, and release the vacuum to the second production tank 1218, and then the aging vessel(s) 116 having the aging mixture 118.

The first volume of liquid 1208 in the first production tank 1206 and the second volume of liquid 1220 in the second production tank 1218 may be primarily made up of distilled water in one or more non-limiting embodiments. In a non-limiting embodiment, a small amount of rubbing alcohol may also be added to the distilled water, but the first volume of liquid 1208 and the second volume of liquid 1220 are primarily made up of water (e.g., distilled water in one or more non-limiting embodiments).

In a non-limiting embodiment, the first production tank 1206 is preferably filled halfway with a first volume of liquid 1208 and the second production tank 1218 is preferably filled halfway with a second volume of liquid 1220. When the system 1200 does not have any external acting force or pressure to disturb the contents of the first production tank 1206 or the second production tank 1218, then the first volume of liquid 1208 and the second volume of liquid 1218 are equalized and are roughly at the same halfway mark in the first production tank 1206 and the second production tank 1218 respectively. When pressure is added or a vacuum created, then all or part of the first volume of liquid 1208 and the second volume of liquid 1220 are pushed into and out of each other's first production tank 1206 and second production tank 1218.

A first set of solenoid valves 1202 are coupled to the first production tank 1206. The first set of solenoid valves 1202 are made up of individual solenoid valves 124 as shown in FIG. 1 and described above. The first set of solenoid valves 1202 are in electric communication via one or more electric wires with the first production tank 1206 and with the one or more relays 128 on the relay controller board 126. The computing rapid aging application 114 is adapted to trigger the respective relay 128 on the relay controller board 126 to open or close one or more solenoid valves 124 that make up the first set of solenoid valves 1202 in order to create pressure that is first applied to the first production tank 1206 and then the effect of that pressure is applied to the second production tank 1218 and then to the aging vessel(s) 116.

The same is true for releasing any compressed air, creating a vacuum, and releasing a vacuum. A particular solenoid valve 124 is first opened or activated in the first set of solenoid valves 1202 associated with the first production tank 1206, and then depending on the particular step in the reoccurring process, the first and second volume of liquid 1208, 1220 in the form of distilled water goes back and forth between the first production tank 1206 and the second production tank 1218 in order to cause oxygen 1222 in the second production tank 1218 to be pushed into or pulled out of the aging vessel 116 to agitate the aging spirit and wood mixture 118 as needed or allow the aging spirit and wood mixture 118 to settle for a period of time in the aging vessel 116. The transfer of liquid 1208, 1220 back and forth between the first production tank 1206 and the second production tank 1218 is useful to allow the closed rapid aging system 1200 to indeed be a closed system that does not require releasing oxygen from the aging vessel 116 to the outside environment and to be a closed rapid aging system 1200.

In the closed system 1200 shown in FIG. 12, there is a second set of solenoid valves 1204 made up of individual solenoid valves 124 coupled to the aging vessel 116 as well. In a non-limiting embodiment, there may be at least four solenoid valves 124 that make up the first set of solenoid valves 1202 associated with the first production tank 1206 and there may be four solenoid valves 124 associated with the second set of solenoid valves 1204. The aging application 114 is programmed to trigger each relay 128 to open or close a particular solenoid valve 124 of the first set of solenoid valves 1202 for a particular step of the aging process (e.g., providing pressurized air, releasing pressurized air, creating a vacuum, and then releasing the vacuum). After a slight delay or short transition period of time, the appropriate relay 128 that is coupled to the designated solenoid valve 124 for the second set of solenoid valves 1204 is then opened and/or closed.

In a non-limiting embodiment, the first volume of liquid 1208 in the first production tank 1206 is displaced and either pushed into the second production tank 1218 or then returned when pressurized air is added to the first production tank 1206 and then released, as well as when a vacuum is created and then released with respect to the first production tank 1206 and next the second production tank 1218 and then the aging vessel 116.

In a non-limiting embodiment, the air compressor 120 is directed to provide filtered, pressurized compressed air from the air compressor 120 to the first production tank 1206 only.

The air compressor 120 never directly provides filtered, pressurized, compressed air to the second production tank 1218.

Further, in a non-limiting embodiment, it may be preferable for pure oxygen from an oxygen tank 1216 be used to provide a first volume of oxygen 1222 and a second volume of oxygen 1224 to the second production tank 1218 and to the aging vessel 116, respectively. In a non-limiting embodiment, as part of any new processing of a new batch of unaged distilled spirit 110, the standard air in the second production tank 1218 and in any connected aging vessel (s) 116 is purged and replaced with pure oxygen from the oxygen tank 1216. Notably, the compressed air from the air compressor 120 is not directed to the second production tank 1218 or to the aging vessel(s) 116 in the closed system 1200. Rather, the oxygen in the second production tank 1218 and the oxygen in the aging vessel(s) 116 can be caused to flow in and out between the second production tank 1218 and the aging vessels 116, but the compressed air from the air compressor 120 is not caused to flow into and out of the second production tank 1218 or the aging vessels 116.

In the closed system 1200, the first volume of liquid 1208 in the first production tank 1206 and the second volume of liquid 1220 in the second production tank 1218 are sometimes forced to flow in and out of the first production tank 1206 and the second production tank 1218 due to the addition or removal of air or the creation of and release of a vacuum on the first production tank 1206 causes the first volume of liquid 1208 and the second volume of liquid 1220 to become displaced and move through the liquid conduits 1210. One or more liquid conduits 1210 in the form of pipes, hoses, tubes, or other types of conduits as well as one or more coupled connectors are connected between the first production tank 1206 and the second production tank 1218 that allows the first volume of liquid 1208 and the second volume of liquid 1220 to flow in and out of the first production tank 1206 and the second production tank 1218 through the liquid conduits 1210.

FIG. 13 is a pictorial illustration of an example of some of the components of closed system 1200. As shown in FIG. 13, an oxygen tank 1216 is included as part of the closed system 1200. In one or more non-limiting embodiment, both the aging vessel 116 and the second production tank 1218 receive oxygen prior to commencing the scheduled series of steps to rapidly age the unaged distilled spirit 110. Accordingly, the oxygen tank 1216 as shown in FIG. 12 and in FIG. 13 supplies oxygen (e.g., via one or more oxygen conduits 1212) to the aging vessel 116 and to the second production tank 1218. In a non-limiting embodiment, both the aging vessel 116 and the second production tank 1218 may be cleaned if either had been used for a previous aging and then primed or supplied with oxygen. As shown in FIG. 12, the second production tank 1218 may receive a first volume of oxygen 1222 from the oxygen tank 1216 and the aging vessel 116 may receive a second volume of oxygen 1224.

In a non-limiting embodiment, when an aging step is initiated by the rapid aging application 114 on a computing device 112, such as providing pressurized air from the air compressor 120 to the first production tank 1206 for a first period of time or releasing the pressurized air, there will be an effect on the first volume of liquid 1208 in the first production tank 1206 and the second volume of liquid 1220 in the second production tank 1218, as well as on the first volume of oxygen 1222 in the second production tank 1218 and the second volume of oxygen 1224 in the aging vessel 116. For example, providing an amount of compressed air initially to the first production tank 1206, causes all or some of the first volume of liquid 1208 in the first production tank 1206 to travel through the one or more liquid conduits 1210, such as that shown in the block diagram in FIG. 12 and in the pictorial illustration in FIG. 13, to the second production tank 1218. The addition of the first volume of liquid 1208 under pressure to the second volume of liquid 1220 in the second production tank 1218 causes the second production tank 1218 to fill up with liquid and this will displace the first volume of oxygen 1222 and force the first volume of oxygen 1222 to move into the aging vessel 116 in order to add enough pressurized air to the aging vessel 116 to provide the pressurization step of the rapid aging process via the closed system 1200. When the rapid aging application 114 determines that the air compressor 120 can be stopped and the pressurized air be released, the first volume of liquid 1208 will flow back from the second production tank 1218 back into the first production tank 1206 which will cause the first volume of oxygen 1222 to flow back into the second production tank 1218 from the aging vessel 116 and reduce the pressure of the air in the aging vessel 116. It is noted that the majority of the first volume of oxygen 1222 may be transferred to the aging vessel 116 when acted upon by either the addition of compressed air from the air compressor 120 to the first production tank 1206 or another action. Some of the first volume of oxygen 1222 may remain in the second production tank 1218 due to remaining space and equalizing pressure from both the first production tank 1206 and the second production tank 1218.

When the rapid aging system 1200 requires that the vacuum be created, the rapid aging application 114 activates the corresponding relay 128 to activate a designated solenoid valve 124 from the first set of solenoid valves 1202 for the first production tank 1206. The vacuum pump 136 is simultaneously activated to create a vacuum in the first production tank 1206. Doing so, causes the second volume of liquid 1220 in the second production tank 1218 to be pulled into the first production tank 1206 through the liquid conduits 1210, and for the second volume of oxygen 1224 in the aging vessel 116 to be pulled into or flow into the second production tank 1218 from the aging vessel 116. This step effectively creates a vacuum for a period of time in the aging vessel 116 which is part of the closed rapid aging process 1200 and the open rapid aging process 100.

As shown in FIG. 12 and FIG. 13, there may be one or more filters 1214 positioned on the oxygen conduits 1212 between the aging vessel 116 and the second production tank 1218 so as to also allow oxygen to travel between the aging tank 116 and the second production tank 1218 so that the oxygen can pass into the aging tank 116 and the second production tank 1218 but any liquids or other objects (e.g., wood staves 108) in either the aging vessel 116 or the second production tank 1218 are not allowed to pass into the aging vessel 116. The filters 1214 help to prevent passage of the first volume of liquid 1208 and the second volume of liquid 1222 into the aging vessel 116. FIG. 13 illustrates an exemplary position of filters 1214*a* and 1214*b* which is used for this purpose. In a non-limiting embodiment, each filter 1214*a* and 1214*b* is directional. As shown in FIG. 13, each filter 1214*a* and 1214*b* are turned in opposite directions of each other. This prevents liquid or moisture from transferring in either direction to either the aging vessel 116 or the second production tank 1218 and prevents contamination to both the second production tank 1218 and the aging vessel 116.

It is noted that the layout of the components shown in FIG. 13 are exemplary only and may be varied in accordance with the general principles of the closed rapid aging system

1200. Further, multiple aging vessels 116 may be associated with a first production tank 1206 and the second production tank 1218 and not just a single aging vessel 116. In application, the first production tank 1206 and the second production tank 1218 may be large volume tanks capable of holding larger amounts of liquid (e.g., first volume of liquid 1208 and second volume of liquid 1220) to cause oxygen to be pushed in and out of the aging vessel 116 if pressure is applied via the air compressor 120 or released or if a vacuum is created or released via the vacuum pump 136.

The relay controller board 126 controls which relays 128 are electronically triggered to open or close a corresponding solenoid valve 124 from a first set of solenoid valves 1202 associated with the first production tank 1206, and also to open or close a corresponding solenoid valve 124 from a second set of solenoid valves 1204 associated with the aging vessel 116. The rapid aging application 114 on the computing device 112 communicates with the relay controller board 126 to trigger particular relays 128 to then open or close the specific solenoid valve 124 that either provides or releases pressurized air from an air compressor 120 in the closed rapid aging system 1200 or that creates or releases a vacuum using the vacuum pump 136.

FIG. 13 further illustrates exemplary conduits that connect components to each other. For example, conduit 1302 couples the aging vessel 116 and the second production tank 1218 for any air (e.g., oxygen) to be caused to flow from the second production tank 1218 into the aging vessel 116 for the pressurized air step when the air compressor 120 directs filtered, pressurized air to the first production tank 1206 for a designated period of time, while conduit 1304 couples the aging vessel 116 and the second production tank 1218 to each other for the air (e.g., oxygen) to flow back into the second production tank 1218 after the pressurized air is released for that step of the closed rapid aging system 1200.

Conduit 1306 couples the aging vessel 116 and the second production tank 1218 to each other in order for oxygen or air from the aging vessel 116 to be directed from the aging vessel 116 into the second production tank 1218 when a vacuum is created and the vacuum pump 136 is activated and directed to the first production tank 1206 first, while conduit 1308 is a conduit coupling the aging vessel 116 and the second production tank 1218 for any air to be returned through conduit 1308 to the aging vessel 116 from the second production tank 1218 when the vacuum is released. As noted above, the rapid aging application program 114 on a computing device 112 is scheduled to open and close relays 128 that open and close solenoid valves 124 associated with the aging vessel 116 to allow the pressurization step, releasing of the pressurized air, creation of a vacuum, and releasing of the vacuum to occur.

FIG. 14 is a flowchart with an exemplary method for a closed rapid aging system 1200 as shown in FIGS. 12-13 in a non-limiting embodiment. At step 1402, the method may begin by opening a first solenoid valve 124 from among the first set of solenoid valves 1202 as shown in FIG. 12 for the first production tank 1206 which has a first volume of liquid 1208. As noted above, the first volume of liquid 1208 and the second volume of liquid 1220 may be distilled water in a non-limiting embodiment.

At step 1404, the method may include adding pressurized compressed air from an air compressor 120 to the first production tank 1206. In a non-limiting embodiment, the air compressor 120 has a pressure sensor and turns on when the PSI drops below a minimum threshold value (e.g. 90 PSI) and turns off when the PSI returns to a maximum value (e.g., 120 PSI). The relay software 114 schedules the period for running the pressurization first step.

At step 1406, the first volume of liquid 1208 can be caused to flow into the second production tank 1218 having a second volume of liquid 1220. At step 1408, opening the first solenoid valve 124 coupled to aging vessel 116. At step 1410, the first volume of oxygen 1222 flows from the second production tank 1218 to the aging vessel 116 to pressurize the aging spirit and wood mixture 118 in the aging vessel 116 for first period of time along with the combination of the added oxygen provided by the first volume of oxygen 1222 to the second volume of oxygen 1224. At step 1412, upon completion of the first period of time, the method includes opening a second solenoid valve 124 coupled to the first production tank 1206 to release the pressurized air in the first production tank 1206. At step 1414, the method may include flowing the first volume of liquid 1208 that was directed by the added pressure of the pressurized air to the second production tank 1218 back into the first production tank 1206 until the liquids are approximately equalized in each respective tank 1206 and 1218.

At step 1416, upon the release of pressurized air from the first production tank 1206, the method may include opening a second solenoid valve 124 coupled to the rapidly aging vessel 116. At step 1418, the method may include flowing the second volume of oxygen 1224 in the aging vessel 116 back into the second production tank 1218 to release the pressure in the aging vessel 116 for a second period of time. At step 1420, the method may include opening a third solenoid valve 124 coupled to the first production tank 1206 and creating a vacuum using vacuum pump 136 after the second period of time ends. At step 1422, the method may include causing the second volume of liquid 1220 from the second production tank 1218 to flow into the first production tank 1206 under a vacuum created by the vacuum pump 136. At step 1424, the method may include opening a third solenoid valve 124 coupled to the aging vessel 116.

At step 1426, the method may include flowing a second volume of oxygen 1224 from the aging vessel 116 to the second production tank 1218 to create a vacuum in the aging vessel 116 for a third period of time. At step 1428, after a third period of time ends, the fourth solenoid valve 124 coupled to the first production tank 1206 is opened to release the vacuum. At step 1430, the vacuum is released by turning off the vacuum pump 136 which will first affect the first production tank 1206. At step 1432, the second volume of liquid 1220 is caused to flow from the first production tank 1206 back to the second production tank 1218 upon the cessation of the vacuum. At step 1434, a fourth solenoid valve 124 from the second set of solenoid valves 1204 that is coupled to the aging vessel 116 is triggered to open. At step 1436, the second amount or volume of oxygen 1224 is caused to flow back into the aging tank 116 from the second production tank 1218 for a fourth period of time. At step 1438, steps (1402)-(1436) are repeated for desired period of time (e.g., anywhere between 90-120 days in a non-limiting embodiment) until a rapidly aged spirit is ready for consumption using computer application 114 to set up a recurrence pattern and recurrence range to schedule each step for the first production tank 1206, second production tank 1218, and the aging vessel 116. In this manner, a rapidly aged spirit 132 that mimics the taste of bourbon, scotch, brandy, or other traditionally aged alcoholic spirits may be created using the closed system 1200 shown in FIGS. 12-14. Once the rapidly aged spirit 132 spirit is determined to be ready for consumption, the rapidly aged spirit 132 may be separately removed from the wood staves 108 in the aging vessel 116 and bottled or otherwise packaged for distribution and consumption by customers.

It is noted in a non-limiting embodiment, if multiple aging vessels 116 are employed in the closed system 1200, then the rapidly aging application 114 programs the opening of the coupled solenoid valves from the first set of solenoid valves 1202 and the second set of solenoid valves 1204 (e.g., for each aging vessel 116) according to the sequenced steps (e.g., adding pressurized air, releasing air, creating a vacuum using the vacuum pump, and releasing the vacuum). In a non-limiting embodiment, the rapid aging program 114 can be programmed to schedule the sequence of steps to match the status of the first production tank 1206 to run in a sequence.

Notably, the user can create various tasting recipes as noted above with differing kinds and amounts of wood staves 108 that are added to the aging vessel 116 and with different types of unaged distilled spirit 110.

Advantageously, the closed system 1200 shown in FIGS. 12-14 produces a great tasting rapidly aged spirit 132 with minimal vapor loss of the rapidly aged spirit 132 as the air used in the aging vessel 116 is never released to the outside environment under the closed system 1200. Rather, the same volume of oxygen, i.e., the second volume of oxygen 1224 in the aging vessel 116 is just either kept in the aging vessel 116 or transferred to the second production tank 1218 for a designated period of time when the vacuum is created, and then the second volume of oxygen 1224 is returned to the aging vessel 116.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. Further, the term "set" as used herein may refer to "one or more" items. Accordingly, "a set" may mean one item or may mean multiple items without limitation thereto.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Further, processors of computing devices may perform the associated tasks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A computer implemented method for rapidly aging spirits using a closed rapid aging system using a computing application, the computer implemented system comprising:
   a. opening a first solenoid valve coupled to a first production tank, wherein the first production tank is partially filled with a first volume of liquid;
   b. adding pressurized air to the first production tank for a first period of time;
   c. upon adding pressurized air to the first production tank, causing the first volume of liquid to flow from the first production tank to a second production tank, wherein the second production tank is initially partially filled with a second volume of liquid,
      wherein the second production tank is further filled with a first volume of oxygen in addition to the second volume of liquid;
   d. upon causing the first volume of liquid to flow from the first production tank to the second production tank, opening a first solenoid valve coupled to an aging vessel, wherein the aging vessel comprises a mixture of unaged distilled spirit and charred wood staves,
      and further wherein the aging vessel further comprises a second volume of oxygen,
      wherein at least one oxygen conduit is coupled from the second production tank to the aging vessel in order for the first volume of oxygen in the second production tank and the second volume of oxygen in the aging vessel to be able to flow back and forth from the second production tank to the aging vessel over a period of time;
   e. upon opening the first solenoid valve coupled to the aging vessel, flowing the first volume of oxygen to the aging vessel through the at least one oxygen conduit for a duration of the first period of time, wherein the mixture of unaged distilled spirit and the charred wood staves are pressurized;
   f. after the first period of time is complete, opening a second solenoid valve coupled to the first production tank and releasing the pressurized air in the first production tank for a second period of time;
   g. upon releasing the pressurized air in the first production tank for the second period of time, flowing the first volume of liquid that transferred to the second production tank at step (c) back to the first production tank, causing the pressure in the second production tank to be reduced, wherein the second volume of liquid in the second production tank becomes generally equalized with the first volume of liquid in the first production tank;
   h. upon the releasing of the pressurized air in the first production tank, opening a second solenoid valve coupled to the aging vessel;
   i. flowing the second volume of oxygen in the aging vessel back into the second production tank for the second period of time thereby relieving the pressurized air in the aging vessel;
   j. opening a third solenoid valve coupled to the first production tank and creating a vacuum in the first production tank for a third period of time, which causes a vacuum to occur in the second production tank such that the second volume of liquid is pulled into the first production tank from the second production tank;
   k. upon creating a vacuum in the first production tank for the third period of time, opening a third solenoid valve coupled to the aging vessel;
   l. upon opening the third solenoid valve coupled to the aging vessel and creating the vacuum in the first production tank for the third period of time, flowing the second volume of oxygen in the aging vessel into the second production tank to create a vacuum in the aging vessel for a duration of the third period of time;
   m. opening a fourth solenoid valve after the third period of time has ended, wherein the fourth solenoid valve is coupled to the first production tank;
   n. upon opening the fourth solenoid valve, releasing the vacuum for a fourth period of time, wherein the second volume of liquid is pushed back into the second production tank;
   o. opening a fourth solenoid valve coupled to the aging vessel, wherein upon opening the fourth solenoid valve coupled to the aging vessel, the second volume of oxygen is returned through the at least one oxygen conduit to the aging vessel and the vacuum is released;
   p. repeating steps (a)-(o) for a desired period of time until a rapidly aged spirit is ready for consumption wherein the computing application comprises one or more interfaces for setting a recurrence pattern and recurrence range to schedule for rapidly aging the spirits in the closed rapid aging system comprising the first production tank, the second production tank, and the aging vessel.

2. The computer implemented method of claim 1, wherein releasing the vacuum in step (o) creates a disturbance of and rapid agitation of the unaged distilled spirit with air bubbles in the aging vessel.

3. The computer implemented method of claim 1, wherein a set of solenoid valves are coupled to the first production tank.

4. The computer implemented method of claim 3, wherein the set of solenoid valves that are coupled to the first production tank comprise four separate solenoid valves that are individually triggered according to a schedule set by the computing application to provide pressurized air to the first production tank, release the pressurized air from the first production tank, create a vacuum in the first production tank, and then release the vacuum in the first production tank.

5. The computer implemented method of claim 1, wherein a set of solenoid valves are coupled to the aging vessel.

6. The computer implemented method of claim 1, wherein the computing application comprises computer interfaces adapted to turn on and off each relay of a relay controller board based on a start date and an end date and for a particular duration of time.

7. The computer implemented method of claim 1, wherein the relay controller board includes relays dedicated to turning on a set of solenoid valves associated with the first production tank and associated with the aging vessel according to a specific recurrence pattern and recurrence range for each aging vessel that is coupled to the first production tank and to the second production tank.

8. The computer implemented method of claim 1, wherein the rapidly aged spirit has a smoothness and flavor of a traditionally barrel aged beverage that is aged for a significantly longer period of time than the rapidly aged spirit.

9. The computer implemented method of claim 1, wherein the charred wood staves are produced from wood that is grinded down into smaller pieces and then charred to a desired level.

10. The computer implemented method of claim 1, wherein unaged distilled spirit is also referred to as moonshine and comprises ethanol spirits.

11. The computer implemented method of claim 1, the first amount of liquid and the second amount of liquid are not allowed to flow into the aging vessel.

12. The computer implemented method of claim 11, wherein the solenoid valves are two way normally closed solenoid valves.

13. A system for rapidly aging spirits using a closed rapid aging system using a computing application, the system comprising:
   a first production tank having a first volume of liquid;
   a second production tank having a second volume of liquid wherein the second volume of liquid is in fluid communication with at least one liquid conduit with the first production tank,
   wherein the second production tank comprises a first volume of oxygen;
   at least one aging vessel, wherein the at least one aging vessel comprises a second volume of oxygen, wherein the at least one aging vessel further comprises an interior cavity adapted to hold a mixture of unaged distilled spirit mixed with charred wood staves added to the interior cavity of the at least one aging vessel;
   an air compressor in fluid communication with the first production tank;
   a vacuum pump in fluid communication with the first production tank;
   comprising:
   a relay controller board having a set of relays;
   a first set of solenoid valves coupled to the first production tank and a second set of solenoid valves coupled to the at least one aging vessel,
   wherein the first set of solenoid valves and the second set of solenoid valves are in electronic communication via one or more electric wires with the set of relays on the relay controller board; and
   a computing device that provides access to the computing application comprising instructions for:
   a. opening a first solenoid valve coupled to a first production tank, wherein the first production tank is partially filled with a first volume of liquid;
   b. adding pressurized air to the first production tank for a first period of time;
   c. upon adding the pressurized air to the first production tank, causing the first volume of liquid to flow from the first production tank to a second production tank, wherein the second production tank is initially partially filled with a second volume of liquid,
   wherein the second production tank is further filled with a first volume of oxygen in addition to the second volume of liquid;
   d. upon causing the first volume of liquid to flow from the first production tank to the second production tank, opening a first solenoid valve coupled to an aging vessel of the at least one aging vessel, wherein the aging vessel comprises a mixture of unaged distilled spirit and the charred wood staves, and further wherein the aging vessel further comprises a second volume of oxygen,
   wherein at least one oxygen conduit is coupled from the second production tank to the aging vessel in order for the first volume of oxygen in the second production tank and the second volume of oxygen in the aging vessel to be able to flow back and forth from the second production tank to the aging vessel over a period of time;
   e. upon opening the first solenoid valve coupled to the aging vessel, flowing the first volume of oxygen to the aging vessel through the at least one oxygen conduit for a duration of the first period of time, wherein the addition of the first volume of liquid in the first production tank to the second volume of liquid in the second production tank with the second volume of oxygen pressurizes the mixture in the aging vessel;
   f. after the first period of time is complete, opening a second solenoid valve coupled to the first production tank and releasing the pressurized air in the first production tank for a second period of time;
   g. upon releasing the pressurized air in the first production tank for the second period of time, flowing the first volume of liquid that transferred to the second production tank at step (c) back to the first production tank, causing the pressure in the second production tank to be reduced, wherein the second volume of liquid in the second production tank becomes generally equalized with the first volume of liquid in the first production tank;
   h. upon the releasing of the pressurized air in the first production tank, opening a second solenoid valve coupled to the aging vessel;
   i. flowing the second volume of oxygen in the aging vessel back into the second production tank for the second period of time and thereby relieving the pressurized air in the aging vessel;
   j. opening a third solenoid valve coupled to the first production tank and creating a vacuum in the first production tank for a third period of time, which causes a vacuum to occur in the second production tank such that the second volume of liquid is pulled into the first production tank from the second production tank;
   k. upon creating the vacuum in the first production tank for the third period of time, opening a third solenoid valve coupled to the aging vessel;
   l. upon opening the third solenoid valve coupled to the aging vessel and creating the vacuum in the first production tank for the third period of time, flowing the second volume of oxygen in the aging vessel into the second production tank to create a vacuum in the aging vessel for a duration of the third period of time;
   m. opening a fourth solenoid valve after the third period of time has ended, wherein the fourth solenoid valve is coupled to the first production tank;
   n. upon opening the fourth solenoid valve, releasing the vacuum for a fourth period of time, wherein the second volume of liquid is pushed back into the second production tank;
   o. opening a fourth solenoid valve coupled to the aging vessel, wherein upon opening the fourth solenoid valve coupled to the aging vessel, the second volume of oxygen is returned through the at least one oxygen conduit to the aging tank and the vacuum is released;
   p. repeating steps (a)-(o) for a desired period of time until a rapidly aged spirit is ready for consumption wherein the computing application comprises one or more interfaces for setting a recurrence pattern and recurrence range to schedule for rapidly aging the spirits in the closed rapid aging system comprising the first production tank, the second production tank, and the aging vessel.

14. The system of claim 13, wherein releasing the vacuum in step (o) creates a disturbance of and rapid agitation of the unaged distilled spirit with air bubbles in the aging vessel.

15. The system of claim 13, wherein a set of solenoid valves are coupled to the first production tank.

16. The system of claim 15, wherein the set of solenoid valves that are coupled to the first production tank comprise four separate solenoid valves that are individually triggered according to a schedule set by the computing application to provide pressurized air to the first production tank, release the pressurized air from the first production tank, create a vacuum in the first production tank, and then release the vacuum in the first production tank.

17. The system of claim 13, wherein the first volume of liquid and the second volume of liquid are not allowed to flow into the aging vessel.

18. The system of claim 13, wherein the charred wood staves are produced from wood that is grinded down into smaller pieces and then charred to a desired level.

19. The system of claim 13, wherein unaged distilled spirit is also referred to as moonshine and comprises ethanol spirits.

20. The system of claim 13, wherein a filter is coupled to the air compressor in order to filter the pressurized air of any impurities prior to the pressurized air being caused to flow to the first production tank.

* * * * *